United States Patent
Khosla et al.

(10) Patent No.: US 9,778,351 B1
(45) Date of Patent: Oct. 3, 2017

(54) SYSTEM FOR SURVEILLANCE BY INTEGRATING RADAR WITH A PANORAMIC STARING SENSOR

(71) Applicant: HRL Laboratories, LLC, Malibu, CA (US)

(72) Inventors: Deepak Khosla, Camarillo, CA (US); David J. Huber, Calabasas, CA (US); Yang Chen, Westlake Village, CA (US); Darrel J. VanBuer, Los Angeles, CA (US); Kevin R. Martin, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 423 days.

(21) Appl. No.: 14/502,944

(22) Filed: Sep. 30, 2014

Related U.S. Application Data

(63) Continuation-in-part of application No. 13/743,742, filed on Jan. 17, 2013, now Pat. No. 9,177,228, which
(Continued)

(51) Int. Cl.
*G01S 13/86* (2006.01)
*H04N 7/18* (2006.01)
(Continued)

(52) U.S. Cl.
CPC .......... *G01S 13/867* (2013.01); *G06T 7/004* (2013.01); *H04N 5/23238* (2013.01); *H04N 7/188* (2013.01); *G06T 2207/10016* (2013.01)

(58) Field of Classification Search
CPC ........ G01S 7/292; G01S 7/414; G01S 13/867; G06T 7/00; G06T 7/11; G06T 7/12;
(Continued)

(56) References Cited

U.S. PATENT DOCUMENTS 5,458,041 A 10/1995 Sun
5,657,073 A * 8/1997 Henley .................. G03B 37/04
                    348/38
(Continued)

FOREIGN PATENT DOCUMENTS

WO    03025859   3/2003
WO  WO 03/025859   3/2003
(Continued)

OTHER PUBLICATIONS

Van den Broek, B.; Burghouts, G.; van den Broek, S.; Smith, A.; Hagen, R.; Anitori, L.; and van Rossum, W. (2009) "Automatic Detection of Hostile Behavior", Proc SPIE vol. 7480 74600R-1.
(Continued)

*Primary Examiner* — Peter Bythrow
(74) *Attorney, Agent, or Firm* — Tope-McKay & Associates

(57) ABSTRACT

Described is system for surveillance that integrates radar with a panoramic staring sensor. The system captures image frames of a field-of-view of a scene using a multi-camera panoramic staring sensor. The field-of-view is scanned with a radar sensor to detect an object of interest. A radar detection is received when the radar sensor detects the object of interest. A radar message indicating the presence of the object of interest is generated. Each image frame is marked with a timestamp. The image frames are stored in a frame storage database. The set of radar-based coordinates from the radar message is converted into a set of multi-camera panoramic sensor coordinates. A video clip comprising a sequence of image frames corresponding in time to the radar message is created. Finally, the video clip is displayed, showing the object of interest.

25 Claims, 7 Drawing Sheets

Related U.S. Application Data is a continuation-in-part of application No. 12/982,713, filed on Dec. 30, 2010, now Pat. No. 8,774,517, which is a continuation-in-part of application No. 12/214,259, filed on Jun. 16, 2008, now Pat. No. 8,363,939, said application No. 13/743,742 is a continuation-in-part of application No. 13/669,269, filed on Nov. 5, 2012, now Pat. No. 9,196,053, which is a continuation-in-part of application No. 12/214,259, which is a continuation-in-part of application No. 11/973,161, filed on Oct. 4, 2007, now Pat. No. 8,165,407, application No. 14/502,944, which is a continuation-in-part of application No. 14/203,256, filed on Mar. 10, 2014, and a continuation-in-part of application No. 13/669,269, which is a continuation-in-part of application No. 12/214,259.

(60) Provisional application No. 61/589,761, filed on Jan. 23, 2012, provisional application No. 61/779,320, filed on Mar. 13, 2013.

(51) Int. Cl.
*H04N 5/232* (2006.01)
*G06T 7/00* (2017.01)

(58) Field of Classification Search
CPC . G06T 7/13; G06T 7/215; G06T 2207/10016; H04N 7/18
USPC .......................................................... 342/52
See application file for complete search history.

(56) References Cited

U.S. PATENT DOCUMENTS

| | | | |
|---|---|---|---|
| 5,940,538 | A | 8/1999 | Spiegel et al. |
| 6,072,889 | A | 6/2000 | Deaett |
| 6,590,521 | B1* | 7/2003 | Saka ................... G01S 13/931 180/167 |
| 6,670,963 | B2 | 12/2003 | Osberger |
| 6,903,676 | B1 | 6/2005 | Frady |
| 7,460,951 | B2* | 12/2008 | Altan ................... G01S 13/726 340/903 |
| 7,680,295 | B2 | 3/2010 | Yoda et al. |
| 8,026,842 | B2 | 9/2011 | Fox |
| 8,699,767 | B1 | 4/2014 | Khosla et al. |
| 8,774,517 | B1 | 7/2014 | Khosla et al. |
| 2004/0036923 | A1 | 2/2004 | Kokemohr et al. |
| 2004/0088726 | A1 | 5/2004 | Ma et al. |
| 2004/0109599 | A1* | 6/2004 | Cho ......................... G06T 7/66 382/145 |
| 2004/0165784 | A1 | 8/2004 | Xie et al. |
| 2004/0178945 | A1* | 9/2004 | Buchanan ............... G01S 11/12 342/70 |
| 2005/0047647 | A1 | 3/2005 | Rutishauser et al. |
| 2006/0126916 | A1* | 6/2006 | Kokumai ............... G03F 9/7076 382/151 |
| 2006/0285724 | A1 | 12/2006 | Tian |
| 2007/0075892 | A1* | 4/2007 | Horibe ................. G01S 17/023 342/70 |
| 2007/0173699 | A1 | 7/2007 | Mathan et al. |
| 2007/0182623 | A1* | 8/2007 | Zeng ..................... G01S 7/4026 342/174 |
| 2007/0236488 | A1 | 10/2007 | Mathan et al. |
| 2008/0031526 | A1 | 2/2008 | Bushell et al. |
| 2008/0056611 | A1 | 3/2008 | Mathan et al. |
| 2008/0187219 | A1 | 8/2008 | Chen et al. |
| 2008/0291075 | A1* | 11/2008 | Rapanotti ................. F41G 3/02 342/20 |
| 2009/0002220 | A1* | 1/2009 | Lovberg .................. G01S 13/89 342/33 |
| 2009/0135065 | A1* | 5/2009 | Tsuchida ............... G01S 13/931 342/454 |
| 2009/0245626 | A1 | 10/2009 | Norimatsu et al. |
| 2010/0002077 | A1* | 1/2010 | Viggiano ............... G01S 13/867 348/115 |
| 2010/0226564 | A1 | 9/2010 | Marchesotti et al. |
| 2011/0229025 | A1 | 9/2011 | Zhao et al. |
| 2012/0089552 | A1 | 4/2012 | Chang |
| 2012/0140061 | A1* | 6/2012 | Zeng ..................... G01S 13/726 348/135 |

FOREIGN PATENT DOCUMENTS

| | | |
|---|---|---|
| WO | WO 03/093947 | 11/2003 |
| WO | WO03093947 | 11/2003 |

OTHER PUBLICATIONS

Schwering, P.B.W.; Lensen, H.A.; van den Broek, S.P.; den Hollander, R.J.M.; van der Mark, W.; Bouma. H.; and Kemp, R.A.W. (2009) "Application of Heterogeneous Multiple Camera Systems with Panoramic Capabilities in a Habor Environment", Proc. SPIE vol. 7481 74810C-1.

MTEQ is the sole fabricator of the government-designed Cerberus Lite Scout | Cerberus Lite G-Boss | APSS (2010), http://www.mteq.com/cgi-bin/dynamic.py?Page=manufacturingServicesCerberus-Lite.

Blighter Explorer (2014), http://www.blighter.com/products/blighter-explorer.html.

Radar Video Surveillance (RVS) Brochure—Automated Detection, Tracking, and Video Response to Security Threats (2006), http://www.honeywellintegrated.com/products/integrated-security/video/97630.html.

Radar Video Surveillance (RVS) Overview (Feb. 26, 2007), http://www.honeywellintegrated.com/products/integrated-security/video/97630.html.

'Kraken' provides needed intelligence, force protection at NIE (Aug. 31, 2011) http://www.army.mll/article/64655/.

Kyungnam Kim, Thanarat H. Chalidabhongse, David Harwood, and Larry Davis. "Realtime foreground-background segmentation using codebook model," Real-Time Imaging, vol. 11, Issue 3, Jun. 2005.

Feng, G.; Tian, W.; Huang, C.; Liu, T.; and Zhang, S. (2008) "Wide Field of View CCD Camera Based on Multi-Sensors Image Mosaics" Congress on Image and Signal Processing (CISP) 2:432-435.

Gerson, A.D.; Parra, L.C.; and Sajda, P. (2006). "Codically Coupled Computer Vision for Rapid Image Search ". IEEE Transactions on Neural Systems and Rehibilitation Engineering, 14(2): 174-179.

Notice of Allowance for U.S. Appl. No. 13/743,742, Date mailed: Jun. 22, 2015.

Notice of Allowance for U.S. Appl. No. 13/669,269, Date mailed: Jul. 17, 2015.

Ruesch et al. (2008) "Multimodal saliency based bottom up attention: a framework for the humanoid robot iCub." Proc. 2008 IEEE Int'l Conf. on Robotics and Automation, pp. 962-967.

Huber et al. (2009) "Fusion of multi-sensory saliency maps for automated perception and control." Proc. SPIE vol. 7336.

Itti et al. (Jan. 2001) "Feature combination strategies for saliency-based visual attention systems." J. Electronic Imaging, vol. 10 No. 1, pp. 161-169.

Klein et al. (Nov. 2011) "Center-surround divergence of feature statistics for salient object detection." Proc. 2011 IEEE Int'l Conf. on Computer Vision, pp. 2214-2219.

Khosla et al. (2009) "Biologically inspired robust and adaptive multi-sensor fusion and active control." Proc. SPIE vol. 7345.

Khosla et al. (2009) "3d hierarchical spatial representation and memory of multimodal sensory data." Proc. SPIE vol. 7345.

Khosla et al. (201 0) "Neurally inspired rapid detection of sparse objects in videos." Proc. SPIE vol. 7697.

Kim et al. (2005) "Real-time foreground-background segmentation using codebook model." Real-Time Imaging, vol. 11 pp. 172-185.

Huber et al. (201 0) "A bio-inspired method and system for visual object-based attention and segmentation." Proc. SPIE vol. 7696, Article 13.

(56) References Cited

OTHER PUBLICATIONS

Notice of Allowance for U.S. Appl. No. 12/982,713, date mailed: Feb. 28, 2014.
Einhauser et al. (Jul. 20, 2007) "A bottom-up model of spatial attention predicts human error patterns in rapid scene recognition." J. Vision, vol. 7 No. 10 Art. 6, pp. 1-13.
Itti et al. (Jun. 2005) "A principled approach to detecting surprising events in video." Proc. 2005 IEEE CS Conf. on Computer Vision and Pattern Recognition, vol. 1 pp. 631-637.
Mundhenk et al. (Jul. 2009) "Automatic computation of an image's statistical surprise predicts performance of human observers on a natural imgae detection task." Vision Research, vol. 49 No. 13, pp. 1620-1637.
Xu et al. (Dec. 2008) "Looking at the surprise: Bottom-up attentional control of an active camera system." Proc. 10th IEEE Int'l Conf. on Control, Automation, Robotics, and Vision, pp. 637-642.
Office Action 1 for U.S. Appl. No. 12/214,259, date mailed: Dec. 15, 2011.
Office Action 1 Response for U.S. Appl. No. 12/214,259, date mailed: Mar. 15, 2012.
Office Action 2 for U.S. Appl. No. 12/214,259, date mailed: Apr. 18, 2012.
Office Action 2 Response for U.S. Appl. No. 12/214,259, date mailed: Jul. 18, 2012.
Notice of Allowance for U.S. Appl. No. 12/214,259, date mailed Aug. 21, 2012.
Walther et al. (Jun. 2005) "Selective visual attention enables learning and recognition of multiple objects in cluttered scenes." Computer Vision and Image Understanding, vol. 100 pp. 41-63.
Ng et al. (Jun. 2006) "Medical image segmentation using k-means clustering and improved watershed algorithm." Proc. 2006 IEEE Southwest Symp. on Image Analysis and Interpretation, pp. 61-65.
Fussenegger et al. (Aug. 2004) "Object recognition using segmentation for feature detection." Proc. 1 ih IEEE Int'l Conf. on Pattern Recognition, vol. 3 pp. 41-44.
Khosla, D. (Sep. 2006) "Biologically-inspired cognitive architecture for integrated learning, action and perception (BICALEAP)." HRL Laboratories, LLC. DARPA/I PTO Final Report N00014-05-C-051 0.
Siagian et al. (Jun. 2005) "Gist: A mobile robotics application of context-based vision in outdoor environment." Proc. 2005 IEEE Comp. Sci. Conf. on Computer Vision and Pattern Recognition, pp. 88+.
Navalpakkam et al. (2006) "An integrated model of top-down and bottom-up attention for optimizing detection speed." 2006 IEEE Comp Sci. Conf. on Computer Vision and Pattern Recognition, vol. 2 pp. 2049-2056.
Ray et al. (1999) "Determination of number of clusters in K-Means clustering and application in colour image segmentation." Proc. 4th Int'l Conf. on Advances in Pattern Recognition and Digital Techniques, pp. 137-143.
Sun, Y., et al., "Probabilistic judgment by a coarser scale: behavioral and ERP evidence," in Proceedings of the Twenty-sixth Annual meeting of the Cognitive Science Society, 2004.
Thorpe, S., et al., "Speed of processing in the human visual system," Nature, vol. 381, pp. 520-522, 1996.
University of California, San Diego Complex Systems and Cognition Laboratory, CSCLAB Image Database http://csclab.ucsd.edu/labeledimages.php. 2006.
Walther D., et al, "Attentional selection for object recognition—a gentle way," Lecture Notes in Computer Science 2525: 472-479, 2002.
Wolfe J.M., "Visual Search in continuous, naturalistic stimuli," Vision Research 34: 1187-1195, 1994.
Vazirani, V., "Approximation Algorithms," Springer-Verlag, Berlin, Germany. pp. 32-33 (2004).
Vogel, E.K., et al., "The Visual NI Component as an index of a discrimination process," Psychophysiology, 2000.
Yamaguchi, S., et al., "Cerebral Asymmetry of the 'Top-down' allocation of attention to global and local features," The Journal of Neuroscience, 20, 1-5, 2000.
Zang H., et al., "SVM-KNN: Discriminative nearest neighbor classification for visual category recognition," CVPR 2006.26.
Vazirani, V., "Approximation algorithms," Springer-Verlag, Berlin, Germany, p. 32, 2004.
http://en.wikipedia.org/Travelling_salesman_problem, Dec. 2, 2009.
Richard P. Wildes, "A measure of motion salience for surveillance applications" in Proc. IEEE Int'l Conf. Image Processing,1998.
B. Draper and A. Lionelle. Evaluation of Selective Attention under Similarity Transforms. In Workshop on Performance and Attention in Computer Vision. Graz, Austria, Apr. 2003.
R. Eckhorn, R. Bauer, W. Jordan, M. Brosch, M. Kruse, W. Munk, and H.J. Reitboeck. Coherent Oscillations: A Mechanism of Feature Linking in the Visual Cortex? Biological Cybernetics 60: 121-130, 1988.
C.M. Gray, P. Konig, A.K. Engel, and W. Singer. Oscillatory Responses in Cat Visual Cortex Exhibit Intercolumnar Synchronization Which Reflects Global Stimulus Properties. Nature 338: 334-336, 1989.
L. Itti and C. Koch. A saliency-based search mechanism for overt and covert shifts of visual attention. Vision Research, 40: 1489-1506, 2000.
L. Itti, C. Koch, and E. Niebur. A Model of Saliency-Based Visual Attention for Rapid Scene Analysis. IEEE Transactions on Pattern Analysis and Machine Intelligence, 20, 1254-1259, 1998.
V. Navalpakkam, L. Itti, Modeling the Influence of Task on Attention. Vision Research, 45: 205-231, 2005.
V. Navalpakkam, and L. Itti. An integrated model of top-down and bottom-up attention for optimal object detection, In: Proc. IEEE Conference on Computer Vision and Pattern Recognition (CVPR), 1-7, 2006.
S.A. Nene, S.K. Nayar, and H. Murase. Columbia Object Image Library (COIL-100). Technical Report CUCS-006-96. Feb. 1996. http://www.cs.columbia.edu/CAVE/software/softlib/coil-100.php.
E. Niebur, C. Koch. Control of Selective Visual Attention: Modeling the 'Where' Pathway. In. D. Touretzky, M. Mozer, and M. Hasselmo. Neural Information Processing Systems (NIPS 8). 802-808. Cambridge, MA, MIT Press. 1996.
F. Orabona, G. Metta, and G. Sandini. Object-based Visual Attention: A Model for a Behaving Robot. In 3rd International Workshop on Attention and Performance in Computational Vision (in CVPR 2005), San Diego, CA, Jun. 2005.
B.J. Scholl. Objects and Attention: The State of the Art. Cognition 80: 1-46, 2001.
Y. Sun and R. Fisher. Hierarchical Selectivity for Object-based Visual Attention. Submitted to Artificial Intelligence. 2004.
D. Walther, L. Itti, M. Riesenhuber, T. Poggio, and C. Koch. Attentional Selection for Object Recognition—a Gentle Way. Lecture Notes in Computer Science 2525: 472-479, 2002.
J.M. Wolfe. Visual Search in Continuous, Naturalistic Stimuli. Vision Research 34: 1187-1195, 1994.
University of California, San Diego Complex Systems and Cognition Laboratory. CSCLAB Image Database. 2006. http://csclab.ucsd.edu/labeledimages.php.
C. Stauffer and W.E.L. Grimson, "Adaptive background mixture models for real-time tracking," Int. Conf. Computer Vision and Pattern Recognition, vol. 2, pp. 246-252, 1999.
A. Elgammal, D. Harwood, and L.S. Davis, "Non-parametric model for background subtraction," European Conf. Computer Vision, vol. 2, pp. 751-767, 2000.
T. Kohonen, "Learning vector quantization," Neural Networks, vol. 1, pp. 3-16. 1988.
Kyungnam Kim, Thanarat H. Chalidabhongse, David Harwood, and Larry Davis, "Realtime foreground-background segmentation using codebook model," Real-Time Imaging, vol. 11, Issue 3, Jun. 2005.
Huber, D. and Khosla, D. "A Bio-Inspired Method and System for Visual Object-Based Attention and Segmentation" Proc. SPIE 7696, 769613 (SPIE Defense, Security, and Sensing), 2010.
L. Itti and P. Baldi. Bayesian Surprise Attracts Human Attention. Vision Research 49: 1295-1306, 2008.

(56) References Cited

OTHER PUBLICATIONS

D. Khosla, C. Moore, D. Huber, S. Chelian. Bio-Inspired Visual Attention and Object Recognition. In: Proc. SPIE Defense, Security, and Sensing, 6560, 656003, 2007.

Navalpakkam V., et al., "Sharing resources: buy attention, get recognition," In: Proc. International Workshop on Attention and Performance in Computer Vision (WAPCV'03), Graz, Austria, Jul. 2003.

Bentin, S., et al., "Electrophysiological studies of face perception in humans," Journal of Cognitive Neuroscience, 8, 551-565, 1996.

Berka, C., et al., "Evaluation of an EEG-workload model in an aegis simulation environment" in Proceedings of SPIE Defense and Security Symposium, 90-99, 2005.

Bhattacharyya, R., et al., "Optimal image ordering for rapid serial visual presentation using electroencephalography," Presented at Society of NeuroScience (SfN) annual meeting, Chicago, 2009.

http://en.wikipedia.org/Travelling_salesman_problem.

Cowell, et al., "Construction and validation of neurophysio-technological framework for imagery analysis," in J.Jacke (Ed.): Human-Computer Interaction, Part II, HCII 2007, LNCS 4551, pp. 1096-1105, 2007, © Springer-Verlag Berlin Heidelberg.

Navalpakkam, V, et al., "Search goal tunes visual features optimally," Neuron, 53, 605-617, 2007.

Eimer, M., "Does the face-specific N170 component reflect the activity of a specialized eye processor?" Neuroreport, 9, 2945-2948, 1998.

Fabre-Thorpe, M., et al., "A limit to the speed of processing in Ultra-Rapid visual categorization of novel natural scenes," Journal of Cognitive Neuroscience, 13, 171-180, 2001.

Gerson, A.D., et al., "Cortically coupled computer vision for rapid image search," IEEE Transactions on Neural Systems and Rehabilitation Engineering, 14(2): 174-179, Jun. 2006.

Gladwell, M., "Blink: the power of thinking without thinking," 1st ed. Little, brown and company: Time Warner Book Group, New York, 2005, pp. 18-47.

Gutin, G., et al., "Traveling salesman should not be greedy: domination of analysis of greedy-type heuristics for the TSP," Discrete Applied Mathematics, 117: 81-86, 2002.

Hopf, J.-M., et al., "Localizing visual discrimination processes in time and space," The American Physiological Society, 88, 2088-2095, 2002.

Smeulders, A., et al., "Content-based image retrieval at the end of the early years," IEEE Transactions on PAMI, 22 (12): 1349-1380, 2000.

Rogowitz, B.E., et al., "Perceptual image similarity experiments," Proceedings of SPIE, 3299: 576-590, 1998.

Itti L., et al., "Bayesian Surprise Attracts Human Attention," Vision Research 49: 1295-1306, 2008.

Itti, L., et al., "Computational Modeling of Visual Attention," Nature Reviews Neuroscience, 2, 194-203, 2001.

Itti, L., "Quantifying the Contribution of low-level saliency to human eye movements in dynamic scenes," Visual Cognition, 12, 1093-1123, 2005.

Keysers, C., et al., "The Speed of Sight," Journal of Cognitive Neuroscience, 13(1), 90-101, 2001.

Khosla D., et al., "Bio-Inspired Visual Attention and Object Recognition," In: Proc. SPIE Defense, Security, and Sensing, 6560, 656003, 2007.

Khosla, D., et al., "A bio-inspired system for spatio-temporal recognition in static and video imagery," Proc. SPIE 6560, 656002, 2007.

Peters, R.J., et al, "Beyond bottom-up: Incorporating task-dependent influences into computational model of spatial attention," in: Proc. IEEE Conference on Computer Vision and Pattern Recognition (CVPR), 2007.

Owechko, Y., et al., "Cognitive swarms for rapid detection of objects and associations in visual imagery," IEEE Swarm Intelligence Symposium, 2005.

Ling, H., et al., "Diffusion distance for histogram comparison," IEEE Computer Society Conference on Computer Vision and Pattern Recognition (CVPR), 2006.

Medasani, S., et al., "Possibilistic particle swarms for optimization," Proceedings 5673 of SPIE/IST Symposium on Electronic Imaging, 2005.

Medasani, S., et al., "Active learning system for object fingerprinting," International Joint Conference on Neural Networks, 2004.

Morrison, D., et al., "Semantic clustering of images using patterns of relevance feedback," in Proceedings of the 6th International Workshop on Content-based Multimedia Indexing (CBMI 2008), London, UK.

Nane S.A., et al., "Columbia Object Image Library (COIL-100)," Technical Report CUCS-006-96, Feb. 1996.

Navalpakkam V., et al., Modeling the Influence of Task on Attention. Vision Research, 45: 205-231, 2005.

Owechko, Y., et al., "A swarm-based volition/attention framework for object recognition," IEEE Conference on Computer Vision and Pattern Recognition, San Diego, 2005.

A. Berg, "Shape matching and object recognition," Ph.D. thesis, UC Berkeley, Computer Science Division, Berkeley, CA, Dec. 2005.

A. Andoni and P. Indyk, "Near-Optimal Hashing Algorithms for Near Neighbor Problem in High Dimensions," Proceedings of the Symposium on Foundations of Computer Science (FOCS'06), 2006.

G.A. Carpenter, et al., "A massively parallel architecture for a self-organizing neural pattern recognition machine," Computer Vision, Graphics, and Image Processing, 37, 54-115, 1987.

G.A. Carpenter, et al., "The what-and-where filter a spatial mapping neural network for object recognition and image understanding," Computer Vision and Image Understanding, 69, 1-22, 1998.

G.A. Carpenter, "Default ARTMAP," in Proc. of the International Joint Conference on Neural Networks (IJCNN'03), 1396-1401, 2003.

G.A. Carpenter, et al., "Self-organizing information fusion and hierarchical knowledge discovery: a new framework using ARTMAP neural networks," Neural Networks, 18, 287-295, 2005.

B. Draper, at al., "Evaluation of Selective Attention under Similarity Transforms," In Workshop on Performance and attention in computer vision, Graz, Austria, Apr. 2003.

R. Eckhorn, et al., "Coherent Oscillations: A Mechanism of feature linking in the visual cortex?" Biological Cybernetics 60, 121-130, 1988.

D.J. Field, "Relations between the statistics of natural images and the response properties of cortical cells," J. Opt. Soc. Am. A., 4: 2379-2394, 1987.

L. Fei-Fei, et al., "Learning generative visual models from few training examples: an incremental Bayesian approach tested on 101 object categories," CVPR 2004, Workshop on Generative-Model Based Vision, 2004.

C.M. Gray, et al., "Oscillatory Responses in Cat visual cortex exhibit intercolumnar synchronization which reflects global stimulus properties," Nature 338: 334-336, 1989.

L. Itti, et al., "A saliency-based search mechanism for overt and covert shifts of visual attention," Vision Research, 40: 1489-1506, 2000.

L. Itti, et al., "A model of saliency-based visual attention for rapid scene analysis," IEEE Transactions on pattern analysis and machine intelligence, 20, 1254-1259, 1998.

C. Koch, et al., "Shifts in selective visual attention: towards the underlying neural circuitry," Human Neurobiology, 4: 219-227, 1985.

S. Lazebnik, et al., "Beyond Bags of Features: spatial pyramid matching for recognizing natural scene categories," In: Proc. IEEE Conference on Computer Vision and Pattern Recognition (CVPR), 2006.

V. Navalpakkam, at al., Sharing resources: buy attention, get recognition, In: Proc. International Workshop on Attention and Performance in Computer Vision (WAPCV'03), Graz, Austria, Jul. 2003.

(56) References Cited

OTHER PUBLICATIONS

V. Navalpakkam, at al., "An integrated model of top-down and bottom-up attention for optimal object detection," In: Proc. IEEE Conference on Computer Vision and Pattern Recognition (CVPR), 1-7, 2006.

E. Niebur, at al., "Control of selective visual attention: modeling the 'where' pathway," In. D. Touretzky, M Mozer and M. Hasselmo. Neural Imformation Processing Systems (NIPS 8), 802-808, Cambridge, MA, MIT, Press 1996.

F. Orabona, et al., "Object-based visual attention: a model for a behaving robot," In 3rd International Workshop on Attention and Performance in Computational Vision (in CVPR 2005), San Diego, CA, Jun. 2005.

B.J. Scholl, "Objects and Attention: the state of the art," Cognition 80, 1-46, 2001.

T. Serre, et al., "Object recognition with features inspired by visual cortex," in Proceedings of the IEEE conference on computer vision and pattern recognition (CVPR), San Diego, CA, Jun. 2005.

Y. Sun, et al., "Hierarchical selectivity for object-based visual attention," Submitted to Artificial Intelligence, 2004.

J.M. Wolfe, "Visual Search in continuous, naturalistic stimuli," Vision Research 34: 1187-1195, 1994.

H. Zang, et al., "SVM-KNN: Discriminative nearest neighbor classification for visual category recognition," CVPR 2006.

Office Action 1 for U.S. Appl. No. 11/973,161, Date mailed: Aug. 9, 2011.

Office Action Response for U.S. Appl. No. 11/973,161, Date mailed: Nov. 9, 2011.

Notice of Allowance for U.S. Appl. No. 11/973,161, Date mailed: Dec. 19, 2011.

Lowe, D.G. (Nov. 2004) "Distinctive image features from scale-invariant keypoints." Int'l J. Computer Vision, vol. 60 No. 2, pp. 91-110.

Thorpe, S., Fize, D. and Merlot, C., "Speed of processing in the human visual system," Nature 381, 520-522 (1996).

Gerson, A. D., Parra, L. C. and Sajda, P., "Cortically Coupled Computer Vision for Rapid Image Search," IEEE Transactions on Neural Systems and Rehabilitation Engineering 14(2), 174-179 (2006).

M. Isard and J. MacCormick (2001). BraMBLe: A Bayesian Multiple-Blob Tracker. Proc. 8th IEEE International Conference on Computer Vision (ICCV 2001). 2: 34-41.

J. Shin, S. Kim, S. Kang, S-W. Lee, J. Paik, B. Abidi, and M. Abidi (2005). Optical Flow-Based Real-Time Object Tracking Using Non-Prior Training Active Feature Model. Real-Time Imaging 11(3): 204-218.

M. Isard and A. Blake (1998). Condensation: Conditional Density Propagation for Visual Tracking. International Journal of Computer Vision. 29(1):5-28.

Comaniciu, D., Ramesh, V., & Meer, P. (2000). Real-time tracking of non-rigid objects using mean shift. Proc. IEEE Conference on Computer Vision and Pattern Recognition (CVPR 2000). 2:142-149.

W.B. DeShetler and J.D. Dillow. (2000). Kalman Filter Tracker. Proc. SPIE 4034, Laser Weapons Technology, 142 (Jul. 21, 2000).

K. Okuma, A. Taleghani, N. de Freitas, J.L. Little, and D.G. Lowe. (2004). A Boosted Particle Filter: Multitarget Detection and Tracking. Proc. 8th European Conference on Computer Vision, Prague, Czech Republic (May 11-14, 2004). 28-39.

Reddy, B. S., & Chatterji, B. N. (1996). An FFT-based technique for translation, rotation, and scale-invariant image registration. IEEE transactions on image processing, 5(8):1266-1271.

Deepak Khosla, David J. Huber, Rajan Bhattacharyya, Mike Daily, Penn Tasinga,"Neurally Inspired Rapid Detection of Sparse Objects in videos," Signal Processing, Sensor Fusion, and Target Recognition XIX, Proc. of SPIE vol. 7697, 76971C, (2010).

Deepak Khosla, Rajan Bhattacharyya, Penn Tasinga, David J. Huber, "Optimal Detection of Objects in Images and Videos Using Electroencephalography (EEG)," Signal Processing, Sensor Fusion, and Target Recognition XX, Proc. of SPIE vol. 8050 80501C-1. (TICR 11-088) (2011).

David J. Huber, Deepak Khosla, "A bio-inspired method and system for visual object-based attention and segmentation," Automatic Target Recognition XX; Acquisition, Tracking, Pointing, and Laser Systems Technologies XXIV; Optical Pattern Recognition XXI, Proc. of SPIE vol. 7696, 769613, (2010).

Deepak Khosla, David J. Huber, "Online, Recursive Estimation of Attention and Salient Regions in Visual Scenes," Automatic Target Recognition XX; Acquisition, Tracking, Pointing, and Laser Systems Technologies XXIV; Optical Pattern Recognition XXI, Proc. of SPIE vol. 7696, 769614, (2010).

David J. Huber, Deepak Khosla, "Bio-inspired "Surprise" for Real-Time Change Detection in Visual Imagery," Automatic Target Recognition XXI, Proc. of SPIE vol. 8049 804904-1 (TICR 11-087) (2011).

Office Action 1 for U.S. Appl. No. 14/203,256, Date mailed: Jun. 24, 2016.

Michael T. Eismann, Alan D. Stocker, and Nasser M. Nasrabadi, "Automated Hyperspectral Cueing for Civilian Search and Rescue", IEEE, Proceedings of the IEEE, vol. 97, No. 6, Jun. 2009, pp. 1031-1055.

Response to Office Action 1 for U.S. Appl. No. 14/203,256, Date mailed: Nov. 23, 2016.

Office Action 2 for U.S. Appl. No. 14/203,256, Date mailed: Feb. 7, 2017.

Andoni A., et al., "Near-Optimal Hashing Algorithms for Near Neighbor Problem in High Dimensions," Proceedings of the Symposium on Foundations of Computer Science (FOCS'06), 2006.

Berg A., "Shape matching and object recognition," Ph.D. thesis, UC Berkeley, Computer Science Division, Berkeley, CA, Dec. 2005.

Carpenter G.A., et al., "A massively parallel architecture for a self-organizing neural pattern recognition machine," Computer Vision, Graphics, and Image Processing, 37, 54-115, 1987.

Carpenter G.A., et al., "The what-and-where filter a spatial mapping neural network for object recognition and image understanding," Computer Vision and Image Understanding, 69, 1-22, 1998.

Carpenter G.A., "Default ARTMAP," in Proc. of the International Joint Conference on Neural Networks (IJCNN'03), 1396-1401, 2003.

Carpenter G.A., et al., "Self-organizing information fusion and hierarchical knowledge discovery: a new framework using ARTMAP neural networks," Neural Networks, 18, 287-295, 2005.

Draper B., et al., "Evaluation of Selective Attention under Similarity Transforms," In Workshop on Performance and Attention in Computer Vision. Graz, Austria, Apr. 2003.

Eckhorn R., et al., "Coherent Oscillations: A Mechanism of feature linking in the visual cortex?" Biological Cybernetics 60, 121-130, 1988.

Field D.J., "Relations between the statistics of natural images and the response properties of cortical cells," J. Opt. Soc. Am. A., 4: 2379-2394, 1987.

Fei-Fei L., et al., "Learning generative visual models from few training examples: an incremental Bayesian approach tested on 101 object categories," CVPR 2004, Workshop on Generative-Model Based Vision, 2004.

Gray C.M., et al., "Oscillatory Responses in Cat visual cortex exhibit intercolumnar synchronization which reflects global stimulus properties," Nature 338: 334-336, 1989.

Itti L., et al., "A saliency-based search mechanism for overt and covert shifts of visual attention," Vision Research, 40: 1489-1506, 2000.

Itti L, et al., "A Model of Saliency-Based Visual Attention for Rapid Scene Analysis," IEEE Transactions on Pattern Analysis and Machine Intelligence, 20, 1254-1259, 1998.

Koch C., et al., "Shifts in selective visual attention: towards the underlying neural circuitry," Human Neurobiology, 4: 219-227, 1985.

Lazebnik S., et al., "Beyond Bags of Features: spatial pyramid matching for recognizing natural scene categories," In: Proc. IEEE Conference on Computer Vision and Pattern Recognition (CVPR), 2006.

(56) References Cited

OTHER PUBLICATIONS

NavalpakkamV., et al., "An integrated model of top-down and bottom-up attention for optimal object detection," In: Proc. IEEE Conference on Computer Vision and Pattern Recognition (CVPR), 1-7, 2006.
Niebur E., at al., "Control of selective visual attention: modeling the 'where' pathway," In D. Touretzky, M Mozer and M. Hasselmo. Neural Imformation Processing Systems (NIPS 8), 802-808, Cambridge, MA, MIT, Press 1996.
Orabona F., et al., "Object-based Visual Attention: A Model for a Behaving Robot," In 3rd International Workshop on Attention and Performance in Computational Vision (in CVPR 2005), San Diego, CA, Jun. 2005.
Scholl B.J., "Objects and Attention: the state of the art," Cognition 80, 1-46, 2001.
Serre T., et al., "Object recognition with features inspired by visual cortex," in Proceedings of the IEEE conference on computer vision and pattern recognition (CVPR), San Diego, CA, Jun. 2005.
Sun Y., et al., "Hierarchical selectivity for object-based visual attention," Submitted to Artificial Intelligence, 2004.

\* cited by examiner

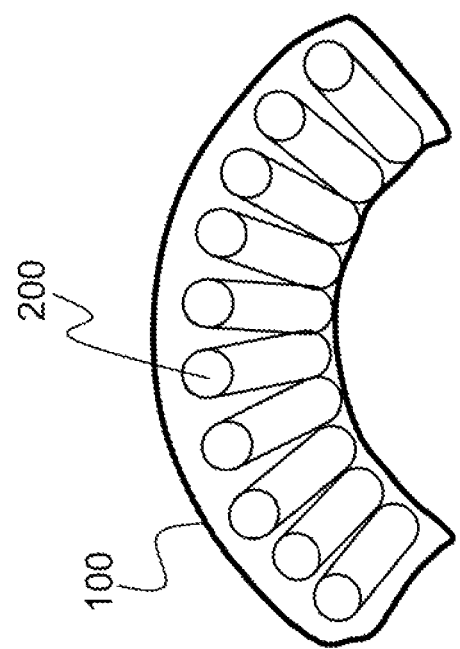
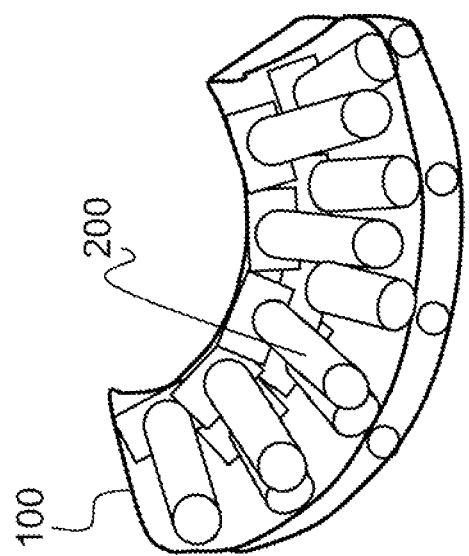

|       | Events | Scout | CT2WS | System |
|-------|--------|-------|-------|--------|
| Day 1 | 104    | 34.62 | 89.42 | 98.08  |
| Day 2 | 100    | 40    | 80    | 89     |
| Day 3 | 64     | 54.69 | 82.81 | 100    |
| All   | 268    | 41.42 | 84.33 | 95.15  |

FIG. 5

SYSTEM FOR SURVEILLANCE BY INTEGRATING RADAR WITH A PANORAMIC STARING SENSOR

CROSS-REFERENCE TO RELATED APPLICATIONS

This is a Continuation-in-Part application of U.S. Non-Provisional application Ser. No. 13/743,742, filed in the United States on Jan. 7, 2013, entitled, "A Method and System for Fusion of Fast Surprise and Motion-Based Saliency for Finding Objects of Interest in Dynamic Scenes", which is a Continuation-in-Part application of U.S. Non-Provisional application Ser. No. 12/982,713, filed on Dec. 30, 2010, entitled, "System for Identifying Regions of Interest in Visual Imagery", now issued as U.S. Pat. No. 8,774,517, which is a Continuation-in-Part application of U.S. Non-Provisional application Ser. No. 12/214,259, filed on Jun. 16, 2008, entitled, "Visual Attention and Segmentation System," now issued as U.S. Pat. No. 8,363,939. U.S. Non-Provisional application Ser. No. 13/743,742 is ALSO a Continuation-in-Part application of U.S. Non-Provisional application Ser. No. 13/669,269, filed on Nov. 5, 2012, entitled, "Motion-Seeded Object Based Attention for Dynamic Visual Imagery", which is a Continuation-in-Part application of U.S. Non-Provisional application Ser. No. 12/214,259, filed on Jun. 16, 2008, entitled, "Visual Attention and Segmentation System", now issued as U.S. Pat. No. 8,363,939, which is a Continuation-in-Part application of U.S. Non-Provisional application Ser. No. 11/973,161, filed on Oct. 4, 2007, entitled, "Visual Attention and Object Recognition System", now issued as U.S. Pat. No. 8,165,407. U.S. Non-Provisional application Ser. No. 13/743,742 is ALSO a Non-Provisional patent application of U.S. Provisional Application No. 61/589,761, filed in the U.S. on Jan. 23, 2012, titled, "A Method and System for Fusion of Fast Surprise and Motion-Based Saliency for Finding Objects of Interest in Dynamic Scenes."

This is ALSO a Continuation-in-Part application of U.S. Non-Provisional application Ser. No. 14/203,256, filed in the United States on Mar. 10, 2014, entitled, "Graphical Display and User-Interface for High-Speed Triage of Potential Items of Interest in Imagery", which is a Non-Provisional application of U.S. Provisional Application No. 61/779,320, filed in the United States on Mar. 13, 2013, entitled, "Graphical Display and User-Interface for High-Speed Triage of Potential Items of Interest in Imagery."

This is ALSO a Continuation-in-Part application of U.S. Non-Provisional application Ser. No. 13/669,269, filed in the United States on Nov. 5, 2012, entitled, "Motion-Seeded Object Based Attention for Dynamic Visual Imagery", which is a Continuation-in-Part application of U.S. Non-Provisional application Ser. No. 12/214,259, filed in the United States on Jun. 16, 2008, entitled, "Visual Attention and Segmentation System", now issued as U.S. Pat. No. 8,363,939.

GOVERNMENT LICENSE RIGHTS

This invention was made with government support under U.S. Government Contract Number W31P4Q-08-C-0264. The government has certain rights in the invention.

BACKGROUND OF THE INVENTION (1) Field of Invention

The present invention relates to a system for surveillance and, more particularly, to a system for surveillance by integrating radar with a panoramic staring sensor.

(2) Description of Related Art

There are several existing surveillance systems that combine camera and radar which are designed for ground-level surveillance. Among them are (1) the Night Vision Labs Cerberus Scout manufactured by MTEQ located at 140 Technology Park Drive, Kilmarnock, Va.; (2) the Blighter Explorer manufactured by Blighter Surveillance Systems located at The Plextek Building, London Road, Great Chesterford, Essex, CB10 1NY, United Kingdom; (3) the Honeywell Radar Video Surveillance (RVS) system manufactured by Honeywell, which is located at 2700 Blankenbaker Pkwy, Suite 150, Louisville, Ky. 40299; and (4) the U.S. Army's COSFPS (a.k.a. the "Kraken"). While designed to be deployed in different situations, these systems all share the common base configuration of a small ground-scanning radar that scans for targets, a camera or cameras (e.g., electro-optical (EO) and infrared (IR)) that can mechanically slew and zoom to regions of interest (most likely as the result of a radar message), and an operator console that allows a human operator to either automatically slew to radar hits or examine other locations by manually controlling the camera.

Any system with a radar and single movable camera configuration will share the same limitations. The cameras in these systems are reactive, meaning that the operator slews the camera to the location of a possible target only after the system registers a radar hit. Because of this, there is an unavoidable delay between the triggering of an event in radar and the operator's examination of the event. At minimum, this delay is the time required to slew the camera to the new location, which might be enough time for the target to change positions, though a skilled operator might be able to "search" the regions surrounding the location of the radar hit and pick up the target. However, a more dangerous scenario is one in which multiple radar messages are received in quick succession of one another. In this case, the system operator must choose which targets to attend to first, quickly analyze the region, and then repeat with the subsequent radar hit locations. It is easy to imagine a scenario in which the operator is swamped by simultaneous radar hits and cannot examine them all in a timely manner. In this situation, targets will escape the vicinity of their radar location.

Thus, a continuing need exists for an advanced panoramic staring sensor that covers a wide field-of-view and continuously records the entire panorama in order to ensure that a radar target is never missed.

SUMMARY OF THE INVENTION

The present invention relates to a system for surveillance and, more particularly, to a system for surveillance by integrating radar with a panoramic staring sensor. The system comprises one or more processors and a memory having instructions such that when the instructions are executed, the one or more processors perform multiple operations. The system captures a set of image frames of a field-of-view of a scene using a multi-camera panoramic staring sensor. The field-of-view of the scene is scanned with a radar sensor to detect an object of interest. A radar detection is received when the radar sensor detects the object of interest. Based on the radar detection, a radar message indicating the presence of the object of interest is generated. Each image frame in the set of image frames is marked with a timestamp. The set of image frames is stored in a frame storage database. The set of radar-based coordinates from the radar message is converted into a set of multi-camera panoramic sensor coordinates. A video clip comprising a sequence of image frames in the set of image frames corresponding in time to the radar message is created. The video clip is displayed, wherein the video clip displays the object of interest.

In another aspect, each image frame in the set of image frames is compared to a background model with an active cognitive processor module. The active cognitive processor module detects at least one cognitive detection in an image frame, wherein the at least one cognitive detection corresponds to a region of the scene that deviates from the background model and represents the object of interest. The active cognitive processor module assigns a cognitive score and a bounding box to each cognitive detection to aid in user analysis. A higher cognitive score corresponds to a greater deviation from the background model, and the bounding box surrounds the object of interest. The cognitive detections having the highest cognitive scores are stored in the frame storage module.

In another aspect, the controller module manages cognitive detections according to the following. A list of cognitive detections having the highest cognitive scores is requested from the active cognitive processor module. For each cognitive detection in the list, a sequence of image frames comprising the image frame corresponding to the cognitive detection and a plurality of image frames before and after the image frame corresponding to the cognitive detection is requested from the capture and recording module. For each cognitive detection in the list, a video sequence corresponding to the time of the cognitive detection is constructed from the sequence of image frames. For each cognitive detection in the list, the video sequence is sent to the user interface for user analysis.

In another aspect, a cognitive score for a region of the field-of-view of the scene in which the radar message originated is retrieved from the active cognitive processor module.

In another aspect, objects of interest are detected, in parallel, with both the active cognitive processor module and the radar sensor independently.

In another aspect, the bounding box is used to perform a classification of the cognitive detection in a classification module using object recognition. A tracker is applied to the bounding box, and the bounding box is tracked across image frames using a tracking module. The tracker is used to switch between a radar message location of the object of interest to a current position of the object of interest in the field-of-view of the scene.

In another aspect, the controller module forwards the video clip to a reactive cognitive processor module, wherein the reactive cognitive processor module performs the following operations. The image frames in the video clip are compared to a background model. At least one cognitive detection is detected in at least one image frame in the video clip, wherein the cognitive detection corresponds to a region of the scene that deviates from the background model and represents the object of interest. A cognitive score and a bounding box are assigned to each cognitive detection to aid in user analysis, wherein a higher cognitive score corresponds to a greater deviation from the background model, and the bounding box surrounds the object of interest.

In another aspect, a plurality of multi-camera panoramic staring sensors is used to continuously capture the set of image frames of the field-of-view of the scene. A plurality of radar sensors are used to detect the object of interest to enable the system to scale up the field-of-view to any predetermined value up to a 360-degree field-of-view.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2A is an isometric-view illustration of a panoramic staring sensor according to the principles of the present invention;

FIG. 2B is a top-view illustration of a panoramic staring sensor according to the principles of the present invention;

FIG. 5 is a table depicting detection results of the present invention according to the principles of the present invention;

DETAILED DESCRIPTION

Figure 1:
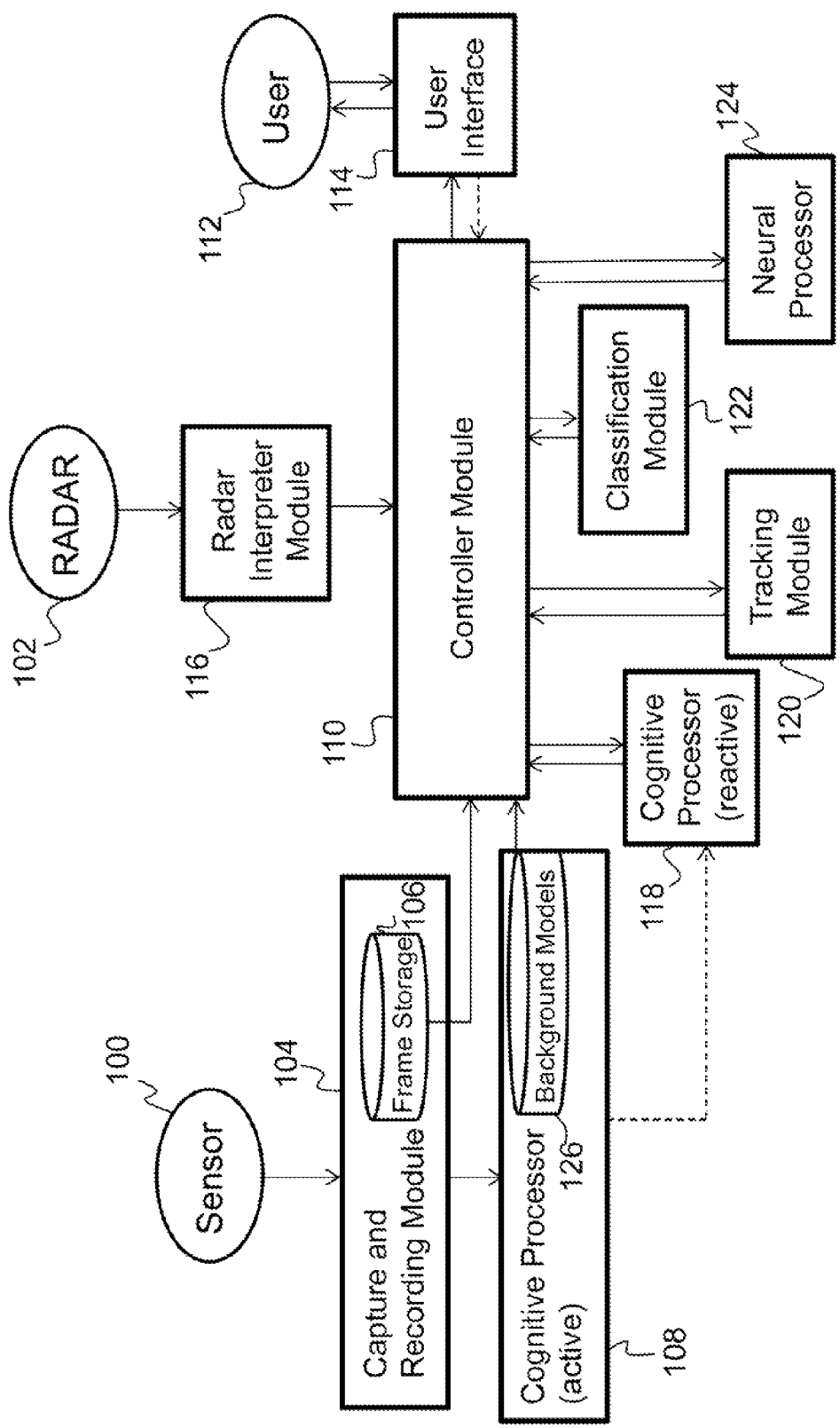
FIG. 1 is a flow diagram of a system for surveillance that integrates radar with a panoramic staring sensor according to the principles of the present invention.

The present invention relates to a system for surveillance and, more particularly, to a system for surveillance by integrating radar with a panoramic staring sensor. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. van den Broek, B.; Burghouts, G.; van den Broek, S.; Smith, A.; Hagen, R.; Anitori, L.; and van Rossum, W., "Automatic Detection of Hostile Behavior", Proc SPIE vol 7480 74800R-1, 2009.
2. Schwering, P. B. W.; Lensen, H. A.; van den Broek, S. P.; den Hollander, R. J. M.; van der Mark, W.; Bouma, H.; and Kemp, R. A. W., "Application of Heterogeneous Multiple Camera System with Panoramic Capabilities in a Harbor Environment", Proc SPIE vol 7481 74810C-1, 2009.
3. Kyungnam Kim, Thanarat H. Chalidabhongse, David Harwood, and Larry Davis, "Realtime foreground-background segmentation using codebook model," Real-Time Imaging, Volume 11, Issue 3, June 2005.
4. Feng, G.; Tian, W.; Huang, C.; Liu, T.; and Zhang, S., "Wide Field of View CCD Camera Based on Multi-Sensors Image Mosaics" Congress on Image and Signal Processing (CISP) 2: 432-435, 2008.
5. Gerson, A. D.; Parra, L. C.; and Sajda, P. "Cortically Coupled Computer Vision for Rapid Image Search". IEEE Transactions on Neural Systems and Rehabilitation Engineering, 14(2): 174-179, 2006.
6. Huber, David J. and Khosla, Deepak. "Bio-Inspired Surprise for Real-Time Change Detection in Visual Imagery." SPIE Defense, Security, and Sensing, Orlando, Fla., 2011.
7. Huber, David J.; and Khosla, Deepak. "A Bio-Inspired Method and System for Visual Object-Based Attention and Segmentation." SPIE Defense, Security, and Sensing, Orlando Fla., 2010.
8. Boris Babenko, Ming-Hsuan Yang, Serge Belongie "Robust Object Tracking with Online Multiple Instance Learning" IEEE TPAMI, August 2011.
9. Kim, Kyungnam; Chen, Yang; Honda, Alexander L.; Jeong, Changsoo S.; Cheng, Shinko Y.; Zhang, Lei; Khosla, Deepak; and Kubena, Randall L. "Bio-Inspired Algorithms for Target Detection and Classification in Airborne Videos." AUVSI Unmanned Systems North America. Las Vegas, Nev., USA. 2012.
10. Khosla, Deepak; Huber, David J.; Bhattacharyya, Rajan; Daily, Michael J. "Neurally-Inspired Rapid Detection of Sparse Objects in Videos." SPIE Defense, Security, and Sensing, Orlando Fla., 2010.

(2) Principal Aspects

The present invention has three "principal" aspects. The first is a system for surveillance which integrates radar with a panoramic staring sensor. The system is typically in the form of a computer system, computer component, or computer network operating software or in the form of a "hard-coded" instruction set. This system may take a variety of forms with a variety of hardware devices and/or sensors and may include computer networks, handheld computing devices, cellular networks, satellite networks, and other communication devices. As can be appreciated by one skilled in the art, this system may be incorporated into a wide variety of devices that provide different functionalities. The second principal aspect is a method for surveillance which integrates radar with a panoramic staring sensor. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

A wide field-of-view and rapid response to threats are critical components of any surveillance system. Field-of-view is normally implemented by articulating a camera: allowing it to swivel to pan and tilt, and actively zooming in on "interesting" locations. Since a single camera suffers from the "soda straw" problem, where only a small portion of the scene can be examined at any given time (leaving the rest of the scene unwatched), surveillance systems often employ a radar unit to direct the operator to likely targets. This provides direction to the search, but still poses a security risk, since potentially hazardous activities might be occurring in an unwatched portion of the field of view while the operator is investigating another incident (either coincidental or intentionally distracting). There are a number of security systems that combine camera and radar that are designed for ground-level surveillance.

Any system with a radar and single movable camera configuration will share the same limitations—the cameras in these systems are reactive, meaning that the operator slews the camera to the location of a possible target only after the system registers a radar hit. Because of this, there is an unavoidable delay between the triggering of an event in radar and the operator's examination of the event. At minimum, this delay is the time required to slew the camera to the new location, which might be enough time for the target to change positions, though a skilled operator might be able to "search" the regions surrounding the location of the radar hit and pick up the target. However, for radar targets that arrive while the operator is examining another target, this delay might be increased beyond the operator's ability to locate the target. Additionally, pan-tilt-zoom units can be troublesome, since moving parts can break down.

By implementing a panoramic staring sensor (that constantly monitors the entire wide field-of-view at maximum resolution) and advanced software modules to process, record, and present the surveillance footage, the system described herein can continuously monitor a wide field-of-view and detect many more potential targets than the state-of-the-art radar-assisted single-camera system.

(4) Specific Details

A flow diagram depicting the system according to the principles of the present invention is shown in FIG. 1. An aspect of this system comprises a multi-camera, panoramic visual sensor 100, a portable radar 102 sensor, and various software modules for control and analysis. In addition, there are a number of aspects that employ optional modules that dramatically improve the ability of the system to detect targets and maintain a low false alarm rate.

The flow of the system is as follows. The panoramic staring sensor 100 is set up to cover an expanded field-of-view (e.g., 120 degrees), and the radar 102 is configured to cover this same field-of-view. The radar 102 scans the field-of-view, and the sensor 100 captures video frames (one from each camera per time step). Video capture is asynchronous with the radar imaging. The frame data is passed into a capture and recording module 104 that exists either in processing hardware or software, where it is stamped with the time of capture and stored into buffer in memory (i.e., frame storage 106) for rapid retrieval.

Continuing with FIG. 1, in one aspect of the present invention, the frames are actively processed using a cognitive processor module 108. In the cognitive processor module 108, the frame is processed through a cognitive algorithm to detect anomalies, changes, and motion. Non-limiting examples of cognitive algorithms that could be used by the system according to the principles of the invention include those described in Literature Reference Nos. 6 and 7, and U.S. application Ser. No. 12/316,779, filed on Dec. 16, 2008, and entitled, Cognitive Neural Method for Image Analysis," all of which are hereby incorporated by reference as though fully set forth herein.

Each of these "detections" is assigned a score and a bounding box in software. Detections with the highest scores are stored in memory and are made available to other modules for subsequent processing. All of this happens independently from the rest of the system. At certain fixed intervals, the system controller (i.e., the controller module 110) can poll the cognitive processor module 108 for its list of detections, collect video clips for these detections by accessing the frame storage 106 (produced by the capture and recording module 104), and display these video clips to the user 112 (operator) through a user interface 114 for analysis.

Radar messages are continuously monitored by a radar interpreter module 116. For the purposes of this application, a "radar detection" refers to when the radar has detected a target, and a "radar message" is a format term in which the radar detection has been packaged as a standard message format. When a radar message indicating the presence of a target has been received, the radar interpreter module 116 converts the radar-based coordinates from the message into coordinates relevant to the multi-camera, panoramic visual sensor 100. In one aspect of the present invention, an operator-defined region of interest (ROI) is employed. In this aspect, radar messages falling outside a pre-designated "listen area" may be ignored at this stage. After this processing has occurred, the radar interpreter module 116 notifies the system controller module 110 that action must be taken. The controller module 110 will then use the time data on the radar message to learn the proper frame number in the video, and then extract a video clip corresponding to this radar target. This clip is then immediately shown to the user 112 for analysis (via, for example, a display device).

Additional alternative aspects of the present invention include processing of video extracted for radar targets through a "reactive" cognitive processor module 118 to visually aid the user 112 in finding targets within the clip (i.e., placing detection boxes) and compute a confidence measure, or additional processing of cognitive and radar targets through algorithms intended to track or classify possible targets in a tracking module 120 or a classification module 122, respectively. Non-limiting examples of tracking and classification algorithms are described in Literature Reference Nos. 8 and 9, respectively. Another aspect of the present invention involves displaying cognitive and/or radar targets through a neural processor module 124 using, for instance, the rapid serial visual presentation (RSVP) paradigm. RSVP measures the electroencephalograph (EEG) of the user 112, allowing the system to reduce the false alarm rate by filtering out imagery that fails to register the sufficient desired neural response from the operator (e.g., the P300 waveform in EEG). RSVP is described in Literature Reference No. 10 and U.S. Pat. No. 8,285,052, entitled, "Image Ordering System Optimized Via User Feedback," which is hereby incorporated by reference as though fully set forth herein.

(4.1) Panoramic Staring Sensor—Capture and Recording Module

A panoramic staring sensor 100 continuously monitors the expanded field-of-view and records all frames as they are captured by the system in the capturing and recording module 104. Although not limited thereto, the sensor 100 employed is similar to that discussed in Feng et al. (see Literature Reference No. 7).

As illustrated in FIGS. 2A and 2B, the sensor 100 is constructed from a series of identical fixed focal length cameras 200 that have been arranged to capture an extended field-of-view. FIG. 2A illustrates an isometric view of the sensor 100, while FIG. 2B illustrates a top view of the sensor 100. For simplicity, the individual cameras 200 within the sensor 100 are referred to as "cameras" and the entire panoramic staring sensor containing multiple cameras is referred to as the "sensor".

Figure 3:
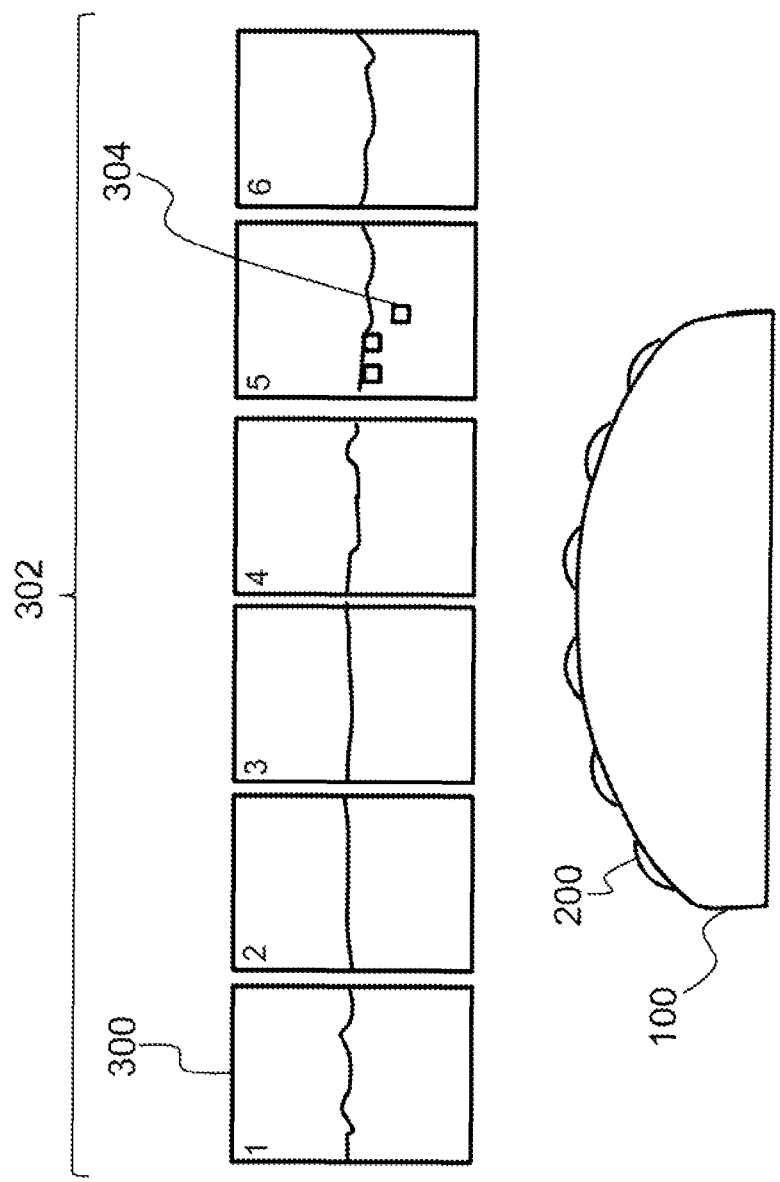
FIG. 3 is an illustration of a panoramic staring sensor field-of-view according to the principles of the present invention.

FIG. 3 depicts a panoramic staring sensor field-of-view. In this instance, each of the six cameras 200 in the sensor 100 captures a portion 300 (numbered 1, 2, 3, 4, 5, and 6) of the entire field-of-view 302 with a marginal amount of overlap between cameras 200. The result is a panoramic capture of the entire field-of-view 302 at each time step, where each individual camera 200 covers a fixed portion 300 of the field-of-view 302. The individual cameras 200 exhibit a limited amount of overlap in their respective coverages to ensure that all blind spots are removed. Since the cameras 200 are incapable of zooming, each camera 200 has sufficiently high resolution that it can detect targets 304 at a desired distance (which should be at least the functional range of the radar so that radar targets can be verified). The sensor 100 is referred to as a "panoramic staring sensor" because it consists of smaller cameras 200 arranged to capture a panorama, and because it continuously records the entire field-of-view 302 at all times.

A capture and recording module (depicted as element 104 in FIG. 1) is assigned to each individual camera 200 in the panoramic staring sensor 100 array. Each of these modules operates completely independently of the others and captures frames from the designated sensor (i.e., camera 200), recording them in a circular buffer of predetermined length (e.g., 100 frames). The frames are marked with a timestamp and indexed in a way that allows for random access and retrieval by the other modules and for correlating with the reports from radar during image retrieval. To conserve communications bandwidth, the frames are stored uncompressed in their native format (i.e., Bayer formatted images are stored in Bayer format). The images are converted out of Bayer format in the other modules after they have been transmitted.

(4.4) Portable Radar and Radar Interpreter Module

Embodiments according to the principles of the present invention may employ a small Doppler radar (depicted as element 102 in FIG. 1) unit with a fixed scan sector that covers the entire field-of-view of the panoramic staring sensor (depicted as element 100 in FIG. 1). The radar (FIG. 1, 102) is assumed to contain software and/or hardware modules that are able to convert the physics of the radar signals and delays into a practical latitude-longitude-elevation format for use by the radar interpreter module (depicted as element 116 in FIG. 1). The objective of the radar interpreter module (FIG. 1, element 116) is to convert the coordinate information received from radar messages into the camera coordinate system, which allows extraction of video from the capture and recording module (depicted as element 104 in FIG. 1) for user/operator analysis. This is carried out through a complex process that involves calibration of the camera sensor (FIG. 1, 100) and radar (FIG. 1, 102) with regards to each other.

The radar system sends position reports of targets detected by the equipment. These reports include a position specified as latitude, longitude, and elevation above mean sea level, which is generated from a distance and heading measurement from a Doppler radar system. The radar system then computes the latitude and longitude of the target based on the position of the radar (FIG. 1, element 102) unit and its orientation. Elevation is determined, for example, by using digital terrain elevation map data (DTED). Accuracy of the position reports is affected by how carefully the radar operator sets the position and orientation of the radar unit in its software. The radar interpreter module 116 listens to the messages sent by other tactical systems to maintain a list of other active sensors and note any reported targets.

There are two main components to calibrating the relation between the sensor 100 and the real world. These are camera intrinsics and a mapping from the external world. There are two parts to calibration of the intrinsic camera parameters, consisting of the individual camera characteristics and the relative alignment between cameras. The individual camera characteristics are defined by the focal length of the lens, the spacing of pixels in the imaging hardware, and the pixel dimensions of the array. These features determine the angular position of each pixel in the image with respect to the center of the image in one camera. The alignment between cameras could either be adjusted to a specified alignment during manufacturing or measured after manufacturing by locating features that appear in the overlapping area of the coverage of adjacent cameras. In either case, the result is a table of the overlap and vertical offset between adjacent pairs of cameras that is used to generate a sensor-wide mapping between pixels and angular positions.

In the most general case, mapping the external world into camera coordinates requires establishing the roll, pitch, and yaw of the sensor 100. Because significant roll and pitch, especially in a wide field imaging system, result in tilted images, curved horizon lines, and messy trigonometric corrections, the sensor 100 is normally set up to be as level as possible. To accommodate corrections for residual amounts of pitch and roll and to determine yaw, world calibration is based on the latitude, longitude and elevation of three points. These points are for the imaging system itself and two landmarks within the field-of-view. In the case of the landmarks, the pixel position of the landmark in the camera array (i.e., sensor; FIG. 1, element 100) is also required. Using this information, a table giving the heading angle and elevation angle of the center of the field-of-view for each camera is created. For cameras containing landmarks, this is computed using the inverse of the calculation given below to determine the pixel position of a target. For other cameras, the central position is based on linear interpolation or extrapolation from the known centers with minor adjustments for the overlap and vertical misalignment measured during sensor intrinsic calibration.

To calculate the pixel position of a given target, standard formulas for great circles on a sphere are used to compute the heading measurement, H, and distance, dist, to target from latitude/longitude of imager and target. Difference in altitude and distance between imager and target is used to compute elevation angle to target, E, where $el_t$ and $el_c$ represent the elevation of the target and camera, respectively, and a tan denotes the arctangent function according to the following:

$$E = a\tan\left(\frac{el_t - el_c}{dist}\right).$$

Given the calculated heading and elevation angles, the system calculates a pixel position ($pix_x$, $pix_y$) for the target in each camera. Typically, only one camera will result in a pixel position within its array, although some targets will fall in an overlap between adjacent cameras and depending on radar coverage, other targets may fall outside all sensors. In the current system, when a target falls within the camera overlap region, the system returns the coordinate belonging to the camera on the right of the overlapping pair.

For each camera, i, the camera coordinate of a given target can be computed. In this case, CX and CY are tables of the heading and elevation of the center of view, respectively, and each camera is W pixels wide and Y pixels high, FL is the lens focal length in millimeters (mm), and P is the pixel pitch in mm. The camera coordinate is computed according to the following:

$$pix_x = \frac{W}{2} + \left(\frac{FL}{P}\right)\tan(H - CX_i)$$

$$pix_y = \frac{V}{2} + \left(\frac{FL}{P}\right)\tan(E - CY_i).$$

These pixel positions may be adjusted slightly based on an estimate of sensor roll. However, in practice, other errors in the overall system, such as radar position, heading, radar range, and heading measurements, are likely to be as large. If the pixel position computed falls outside the camera sensor array, the target is not visible in that camera.

(4.5) Cognitive Processor

Referring to FIG. 1, the cognitive processor module 108 provides analysis of the video from the scene captured by the capturing and recording module 104 and detects anomalies in the video. These "cognitive detections" are regions of the scene that deviate from a background model 126 that the cognitive processor module 108 learns by analyzing the scene for a fixed number of frames. Each cognitive detection is described as a bounding box with a score that describes the magnitude of the deviation from a background model 126. The cognitive processor module 108 allows easy ranking of potential items of interest and can aid the user 112 in identification of threats. This module is not required, but generally improves the overall detection performance of the system.

In alternative aspects of the system, the system may have an "active" cognitive processor module (represented by element 108 in FIG. 1) or a "reactive" cognitive processor module (represented by element 118 in FIG. 1). Systems with both an "active" cognitive processor module 108 and a "reactive" cognitive processor module 118 are also possible. For either "active" or "reactive" types, the cognitive processor module (108 or 118) continuously analyzes the image data captured by the panoramic staring sensor 100 and executes anomaly and change detection algorithms on the data, looking for motion or other "salient" features that do not agree with that established in some background model 126. Descriptions of anomaly and change detection algorithms can be found in U.S. application Ser. No. 14/203,256, entitled, "Graphical Display and User-Interface for High-Speed Triage of Potential Items of interest in Imagery"; U.S. application Ser. No. 12/982,713, entitled, "System for Identifying Regions of Interest in Visual Imagery"; and U.S. application Ser. No. 13/669,269, entitled, "Motion-Seeded Object Based Attention for Dynamic Visual Imagery," which are hereby incorporated by reference as though fully set forth herein.

At the start of a run, the "active" cognitive processor module 108 will monitor the scene for a fixed number of frames (e.g., 50 frames) and build a statistical model (i.e., background model 126) of the expected content of the scene. After this background model 126 is created, it is compared to each new incoming frame, which yields a set of "foreground" pixels that violate this background model 126 and represent an unexpected occurrence. These pixels are filtered and grouped by blob extraction algorithms, such as region-based image segmentation and connected-component labeling, and returned as a rectangular region that indicates the center, width, and height of the detection with a score that corresponds to how far from the background model 126 the detection has deviated.

In one aspect of the system, the panoramic staring sensor 100 may have an attached "active" cognitive processor module 108, which processes all frames and determines a set of "cognitive detections" independent of all other systems. In this aspect, the background model 126 must only be computed once at the start of processing or whenever the sensor 100 is moved. In the "active" configuration, the cognitive processor module 108 computes on all incoming frames and records the highest scores for each region in the image (e.g., quadrants) over a given time interval (e.g., 30 seconds). The cognitive detections are sent to the controller module 110 at these fixed intervals. The cognitive detections are treated like radar detections, with video extraction and reporting to the user 112 occurring at routine intervals. All cognitive detections are imprinted with a score and detection rectangle that can be displayed in the user interface 114 on top of the video clip, at the user's 112 discretion.

In another aspect of the system, the cognitive processor module may work in a "reactive" configuration (depicted as element 118 in FIG. 1). In this configuration, the cognitive processor module 118 is used to compute scores and target rectangles for radar detections, but does not independently produce new targets for the user 112 to analyze. The "reactive" cognitive processor module (FIG. 1, element 118) can be implemented in one of two ways: prior to the receipt of the radar target or as a response to the receipt of the radar message.

To implement the "reactive" cognitive processor module 118 prior to receipt of a radar message, each frame must be processed by the cognitive algorithm as with the active system (element 108). Scores are continuously computed for each region of the image. When a radar target is received, the system finds the score of the region that contains the camera coordinates of the radar target. This method has the benefit of not requiring extra processing after the radar target message has been received; however, this method cannot provide a bounding rectangle for the target.

To implement the "reactive" cognitive processor module 118 after the receipt of a radar message, frames are extracted for the time that the radar message was received and for several frames prior (e.g., thirty frames). These frames are passed through the "reactive" cognitive processor module 118. The detection algorithm trains on the first few frames and then processes the remaining frames for change. While this method requires nominal additional processing time, it has the benefit of providing the user 112 with both a score and a target bounding rectangle for each radar target. This provides the user 112 with extra information that he or she can use to determine the validity of a given target.

In a third aspect of the system, the system may contain both an "active" and "reactive" cognitive processor modules (represented by elements 108 and 118 in FIG. 1, respectively). In this case, the "active" cognitive processor module 108 functions exactly as it does in the first aforementioned aspect: processing all frames as they are captured and logging the strongest detections over a period of time for the controller module 110 to request. Likewise, the "reactive" cognitive processor module 118 works on frames that correspond to radar messages. The key difference in this aspect is that the "reactive" cognitive processor module 118 may be able to use the background model 126 computed by the "active" cognitive processor module 108, rather than computing a brand new background model for each radar detection. Since the background model 126 is built on a per-pixel basis, it is possible for the controller module 110 to request the background model 126 for each pixel from the "active" cognitive processor 108. This permits the "reactive" cognitive processor module 118 to run more efficiently and return more frames with detection boxes, since frames that contribute to background model training cannot yield detection rectangles.

(4.6) Controller Module

The controller module 110 drives the timing of the system and mediates communication between all of the other modules. In the baseline aspect of the system, the controller module 110 acts as a simple intermediary between the radar interpreter module 116, the frame storage 106, and the user interface 114. As each radar message is received, the controller module 110 places it into a queue that is continuously polled for entries that do not contain image data. Any type of scheduler may be employed for this process, but it is often adequate to employ a FIFO (first in, first out) queue in which the oldest radar target that does not yet have image data will be processed before newer radar targets. For each radar message in the queue, the controller module 110 performs a lookup on the proper frame number within the frame storage 106 database corresponding to the time of the radar message, and then requests a series of frames at and around the time of the radar message.

The frame window can be adjusted based on the type of surroundings and expected targets. For example, the controller module 110 may request thirty frames, where twenty of those frames may be from before the radar hit to give the operator the opportunity to see the events that led up to the radar message. The remaining ten frames can be obtained from after the radar message, centering the message somewhere in the middle. However, one must remember that obtaining frames after the radar message requires a wait before the user 112 can examine the video. After the video frames are obtained from the capture and recording module 104, the video clip is sent to the user interface 114 for user 112 analysis. In aspects of the system that include an "active" cognitive processor module 108 but not a "reactive" cognitive processor module 118, the controller module 110 will retrieve a cognitive score for the region in which the radar message originated. In this case, radar detection video clips are displayed to the user 112 immediately upon receipt of imagery and cognitive score.

In aspects of the system that employ an "active" cognitive processor module 108, the role of the controller module 110 is expanded to manage cognitive detections as well as radar detections. In this instance, the controller module 110 will monitor the frame count and request the top detections from the "active" cognitive processor module 108. For each cognitive detection in this list, the controller module 110 will request image information in the immediate vicinity of the cognitive detection at the appropriate frame number and construct a short video sequence of the scene at the time of the detection. The detection rectangle may be superimposed on this video for analysis by the user 112. Once the video clips for all cognitive detections have been fetched from the capture and recording module 104, the controller module 110 sends them to the user interface 114 for user 112 analysis.

In aspects of this system that employ a "reactive" cognitive processor module 118, the controller module 110 must forward the video clip for each radar detection to the "reactive" cognitive processor module 118. The controller module 110 sends the results from cognitive processing to the user interface 114 for user 112 analysis. In this aspect, radar detection video clips are displayed to the user 112 immediately upon completion of the cognitive processing.

The controller module 110 can also support additional modules to assist the user 112 in the task of analyzing detections. After the controller module 110 has requested video frames for either a cognitive or radar detection, further processing, such as the application of additional cognitive algorithms, tracking with the tracking module 120, or classification with the classification module 122, may be applied. These options are described below.

(4.7) Additional Processing

Alternative aspects of the present invention may be implemented through the addition of optional processing modules. The objective of this processing is to enhance the user's 112 experience with the system, aid in finding threats, and eliminate false alarms from radar and cognitive detections. Below is a description of potential optional subsystems that can be added to the controller module 110 of the baseline aspect of the system. Many of these subsystems rely on the processing result of other optional modules and, therefore, might not be feasible in all possible aspects of the system.

In aspects of the invention that include a cognitive processor (108 and/or 110) that computes a bounding box for each cognitive and radar detection, one can apply additional processing in the form of tracking and classification/recognition of the object within the detection. In the tracking module 120, tracking software can be implemented as part of the controller module 110 to automatically track the most likely threats from radar hits and the cognitive algorithm processing and present these results alongside the recorded results in the user interface 114. The objective of such a tracking system would be to allow the user 112 to switch seamlessly between the recorded footage of the target from the radar detection and the target's current location. If the target is deemed to be a threat, the current location is critical information.

An object recognition module can also be applied to the video data corresponding to each cognitive or radar detection. In aspects of the system where a detection is marked with a bounding box (i.e., when the cognitive processor (elements 108 and/or 118) is employed), the contents of this bounding box may be submitted to an object recognition/classification module 122 in order to apply a classification label to the detection. These labels might be utilized by the user 112 to rank or queue detections for analysis.

Another possible module that can be implemented in this system is a top-down biasing module that accepts user 112 input and modulates how the system responds to radar hits within certain regions, or how the cognitive processor module (elements 108 and/or 118) works with frame data. For example, the user 112 could choose to completely ignore cognitive and radar detections from certain portions of the scene. In this instance, the cognitive processor (elements 108 and/or 110) would be set to not process these regions of the scene, and all radar messages that originate from the ignored portion of the scene would not be presented to the user 112. An inhibition operation could be implemented in the same way. However, instead of removing regions of the scene from processing, the system would modulate the scores and queuing of cognitive and radar detections in inhibited regions to move them to a lower spot in the order of processing and user analysis.

To reduce the false alarm rate of video clips sent to the user 112, one aspect of the present invention could make use of a neural processor module (depicted as element 124 in FIG. 1). The neural processor module (FIG. 1, element 124) employs a "human-in-the-loop" approach that measures the operator's brain activity and uses this information to re-rank and filter out detections that are probable false alarms. An example of a method employed by the neural processor module (element 124) is described in Literature Reference 8. For simplicity, the present application only describes this process at a high level. Using this method, the video clips corresponding to cognitive and radar detections are displayed sequentially to the user 112 via a rapid serial visual presentation (RSVP) paradigm, and the user's electroencephalograph (EEG) is recorded and processed by an algorithm, which looks for the presence of the "P300" waveform in the EEG, which corresponds to a measure of surprise. The algorithm involves neural decoding that processes spatiotemporal EEG data to detect P300 and comes up with a score for presence and confidence in P300 (see Literature Reference No. 10, U.S. Pat. No. 8,285,052, and U.S. Pat. No. 8,214,309, which are hereby incorporated by reference as though fully set forth herein, for detailed descriptions of processing of the EEG signal). Each detection is given a score based on the EEG at the time of the presentation of the video, which can be used for queuing or ranking of the detections in the user interface (depicted as element 114 in FIG. 1). Cognitive or radar detections whose neural scores fall below some predetermined threshold may even be omitted from further user/operator analysis.

(4.8) User Interface

Once the radar has sent a message and video imagery has been procured by the controller software, the radar hit can be displayed by the user interface (depicted as element 114 in FIG. 1). In implementations of the system described herein, the "Threat Chip Display" (TCD) was employed to quickly display videos from cognitive and radar detections. Literature Reference No. 4 provides a description of the TCD. Additionally, this display shows a panoramic image of the entire field-of-view and a top-down map with the latitude-longitude location of the targets displayed. However, the user interface 114 is not necessarily limited to the TCD implementation. A valid implementation of a user interface 114 must be able to show cognitive and radar detections at full resolution and accept feedback from the user 112 in the form of, for instance, target designation and algorithm biasing. The display should also allow the user 112 to switch between the recorded footage and a "live" view of the region, as well as allow the user 112 to pan and zoom the field-of-view to simulate the operation of single-camera systems. Additionally, the display should show a small, full-resolution video for each target and its relative location in the entire field-of-view. Both of these displays are essential to the user's ability to identify and respond to possible threats in the field.

Radar detections can be added to the display as they are completed (i.e., asynchronously) or synchronously in bursts that occur at some fixed time interval (e.g., every thirty seconds). In aspects that include an "active" cognitive processor module (FIG. 1, element 108), the cognitive detections are usually updated at fixed time intervals (i.e., no asynchronous operation).

As described above, the user (FIG. 1, element 112) can also adjust the region of interest of the system using the user interface (FIG. 1, element 114). This is done by designating a region (or regions) in each sensor frame as "out of bounds". In order to be able to designate a region (or regions) as out of bounds, the entire image is gridded into small regions (chips or rectangles), and the user can check on or off one or more regions via the user interface (FIG. 1, element 114). This controls whether they are in bound or out of bound (i.e., ignored for processing). This control is in addition to coarse region of interest selection via horizontal lines that span the full image.

A signal is then sent from the graphical user interface 114 to the controller module (FIG. 1, 110) that causes it to discard any radar detections that originate from these regions. This allows the system to filter out radar detections from regions that are known to have a high false alarm rate or regions that the user 112 has predetermined will not contain threats. The user 112 may also choose to mark detection videos as "inhibit" or "ignore". Doing so affects the cognitive and radar processing of detections within the controller module 110.

(4.9) Scalability of the System

Figure 4:
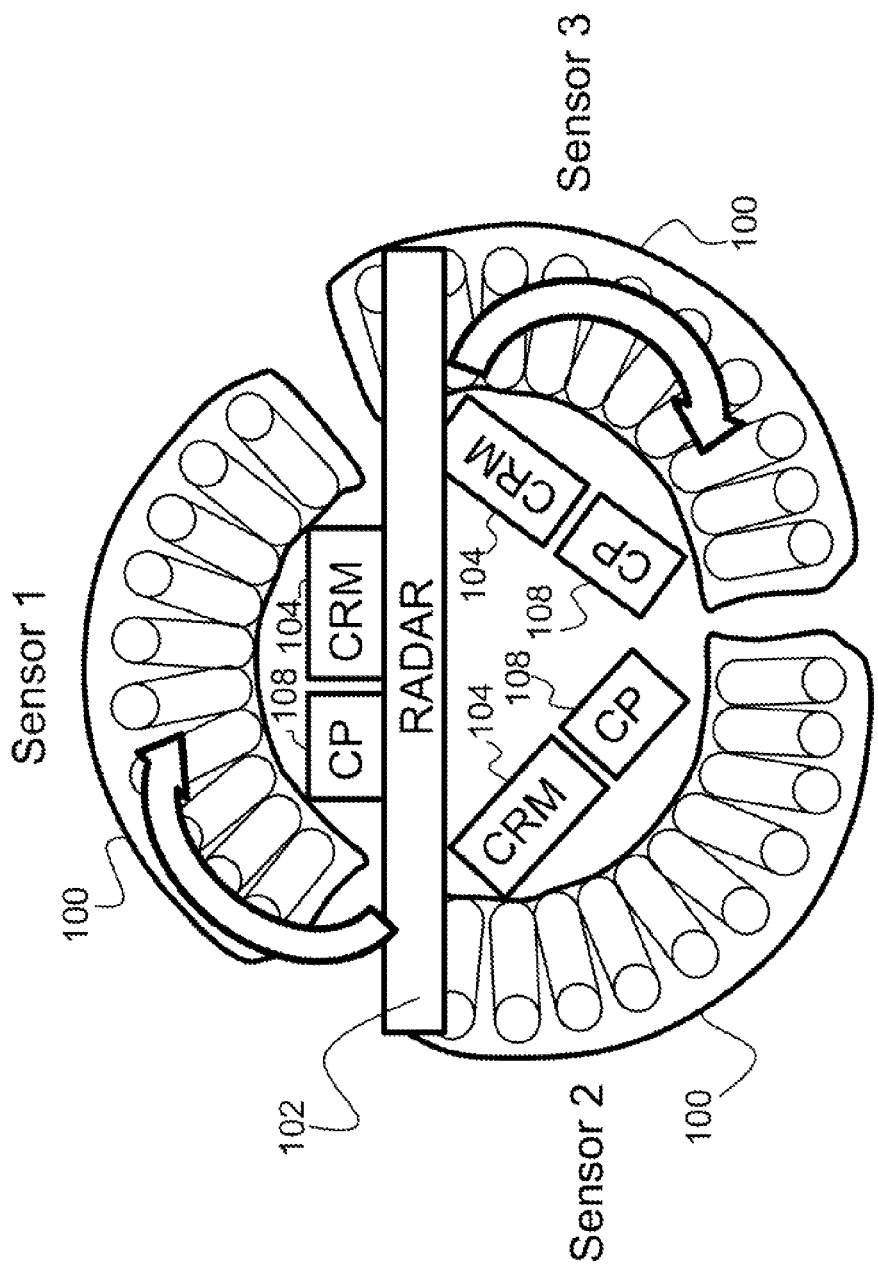
FIG. 4 illustrates scalability of the system according to the principles of the present invention.

A key feature of the present invention is its ability to scale up from its default field-of-view to any arbitrary value, up to a full 360-degree field-of-view. As illustrated in FIG. 4, an alternate aspect of the invention involves implementing additional panoramic staring sensors 100 (and optionally, additional radars to decrease the scan time) to cover the expanded 360-degree field-of-view. As a non-limiting example, a 360-degree system can be made from the present invention by aligning three, 120-degree systems to cover the entire field-of-view. This non-limiting configuration employs a single radar 102 that scans in one direction and rotates clockwise (as illustrated by the arrows), although a second radar could be used to scan in both directions at once, reducing the scan time. Each 120-degree system has its own capture and recording module (CRM) 104 and "active" cognitive processor (CP) module 108 so that increasing the field-of-view does not affect processing speed or system response to targets. All systems can share the same controller module and user interface (not shown).

The implementation of additional panoramic staring sensors 100 does not affect the processing speed or detection effectiveness of the system; the only difference between the baseline system and the expanded 360-degree system shown in FIG. 4 is the number of detections presented to the operator/user. This is because the processing hardware and memory expands with the field-of-view. Each panoramic staring sensor 100 is assigned a corresponding capture and recording module (CRM) 104 and an "active" cognitive processor module (CPM) 108, which ensures that the processing of individual frames increases linearly with field-of-view width. The radar 102 must be configured to scan the entire 360-degree field-of-view, and additional radars may be implemented to increase the scan frequency of any given region within the field-of-view.

In operation, expanding the field-of-view results in more cognitive and radar detections. The processing of these detections is carried out exactly the same as in the baseline system. The controller module (depicted as element 110 in FIG. 1) will request multiple frames of video for detections resulting from radar detections (and cognitive detections if the "active" cognitive processor module (FIG. 1, element 108) is available). These videos will be passed through whatever additional processing is available and presented to the user (FIG. 1, 112) for inspection. Since the panoramic staring sensor (FIG. 1, element 100) can capture the entire 360-degree field-of-view without slewing a camera, expanding the field-of-view does not add delay to this procedure. In aspects of the invention with the "active" cognitive processor module 108, the controller module 110 will still request the top cognitive detections and video frames at regular intervals and present them to the user 112. Due to the design of the user interface (FIG. 1, element 114) and lack of camera control, these additional detections do not increase the response time or the user's 112 ability to analyze the detections in a timely manner.

The system described herein can also be scaled down to a smaller field-of-view. This is carried in the baseline system by disabling sensors in the capture and recording module (FIG. 1, element 104) and the controller module (FIG. 1, element 110) that correspond to regions in the scene that are not important, which are not processed. Alternatively, panoramic staring sensors (FIG. 1, element 100) can be built using fewer individual cameras in order to narrow the field-of-view.

(4.10) Experimental Studies

Experimental studies were performed on the system described herein using a combination of video recorded from the panoramic staring sensor and radar that was collected. A series of forty-five minute scenarios were conducted in which dismounts and vehicles moved within a 120-degree field-of-view in front of the camera/sensor. The vehicles and dismounts exhibited varying degrees of avoidance to being seen by the camera/sensor. For the purposes of ground truth, each dismount and vehicle was equipped with a global positioning system (GPS) recorder, which continuously recorded the position of each dismount and vehicle. A four-sensor 120-degree wide field-of-view camera was used to capture video of the scenario, and a portable radar unit was deployed to cover the same 120-degree field-of-view. All scenarios contained a total of 268 events.

As the scenario occurred, the video from each camera was processed with a change detection process that pulled out anomalies and scored each region in the video with a measure of how anomalous it was. The change detection process is described in U.S. application Ser. No. 13/743,742, entitled, "A Method and System for Fusion of Fast Surprise and Motion-Based Saliency for Finding Objects of Interest in Dynamic Scenes," which is hereby incorporated by reference as though fully set forth herein. "Anomalies" are defined as objects of interest in the videos discovered by the change detection process.

Simultaneous to the change detection processing, the radar was run and targets were retrieved by the system in real time. As each target was detected by the radar, the system converted the radar tilt-range information into latitude-longitude, and again into sensor and camera coordinates (s; x, y) in the radar interpreter module. From the camera coordinates, a short video clip (e.g., 5 frames) was obtained for a 512-by-512 pixel region centered at the location of the detection (i.e., the set of multi-camera panoramic sensor coordinates). Additionally, the "cognitive score" was copied from the cognitive processor module for the purpose of ranking the radar targets in the user interface.

The targets were displayed to the user/operator in real-time as they were detected by the radar. The method for display was a TCD layout. At this time, the user examined the video and determined which detections were from actual items of interest and which were not. At thirty-second intervals, the user was also presented with the top fifty results from the cognitive algorithms over that time period.

A ground-truth for each scenario was constructed from the GPS data from each dismount and vehicle. The location of each dismount and vehicle was computed in sensor coordinates (s; x, y) for each frame from latitude-longitude coordinates using the same conversion method used to convert the radar hits into camera coordinates. The GPS tracks and sequence frames may not be captured at exactly the same time; therefore, the GPS data was used for each target that provided the closest match in time of day to when the frame was captured. For instances where there was a large difference in the camera coordinates for a given target between GPS samples, linear interpolation between the two nearest GPS samples was used.

The results of the experimental trials are displayed in the table depicted in FIG. 5. The table compares the present invention (System column) with results of the state-of-the-art Cerberus Scout (Scout column) and CT2WS (CT2WS column) systems. Numbers listed are the pD (i.e., fraction of detections) for the given system for each day. While the results for the present invention were computed from recorded video and radar, the results from the Scout and CT2WS systems were obtained during the actual field test. While there is not any false alarm data for these trials, one can see that the combination radar and panoramic staring sensor system (with the "active" cognitive processor module) according to the principles of the present invention (System column) was able to detect 95% of the available (i.e., all) targets, outperforming the CT2WS system at 84%, and greatly outperforming the Cerberus Scout system at 41%.

Figure 6:
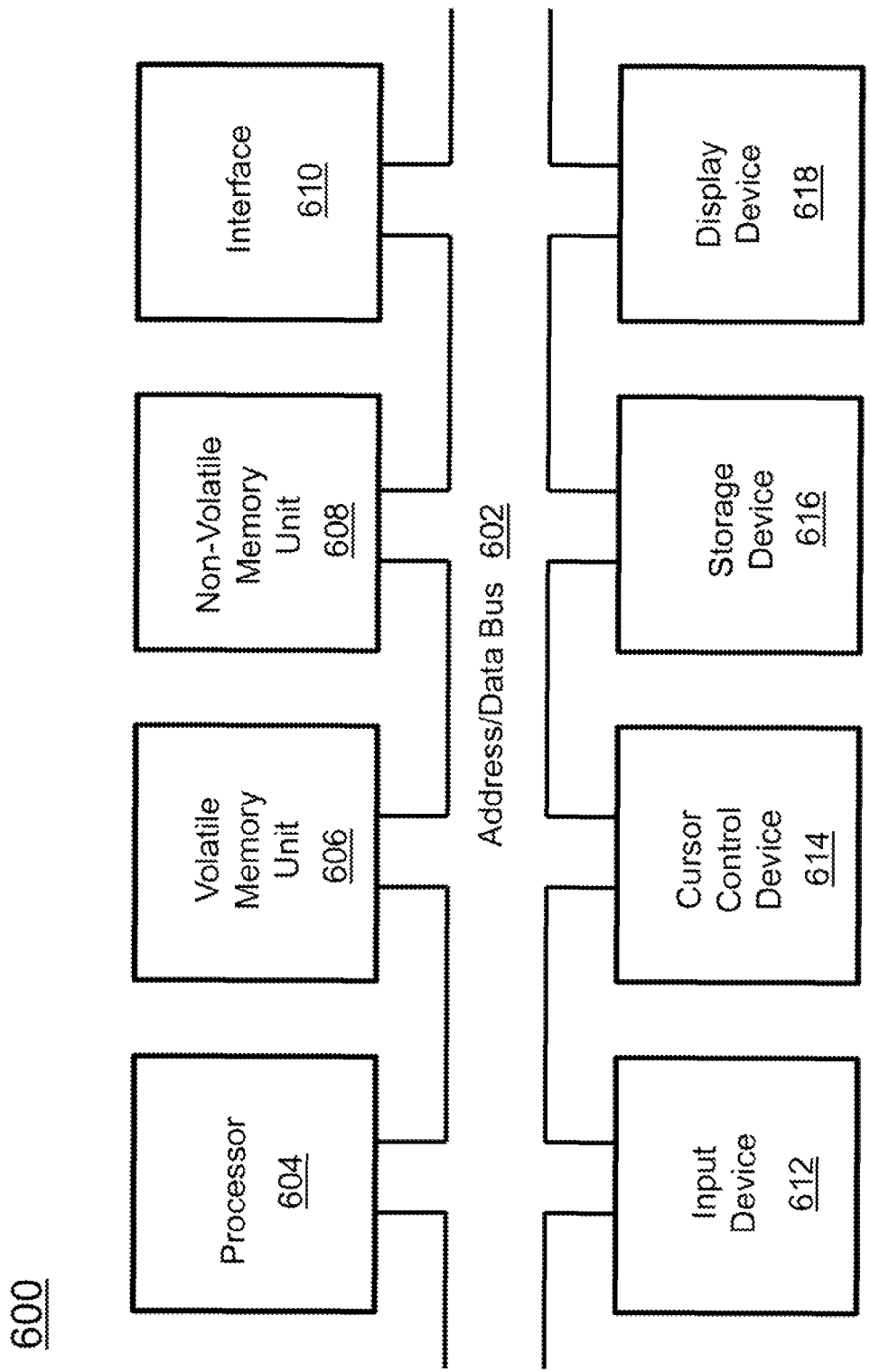
FIG. 6 is an illustration of a data processing system according to the principles of the present invention.

An example of a computer system 600 in accordance with one aspect is shown in FIG. 6. The computer system 600 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 600. When executed, the instructions cause the computer system 600 to perform specific actions and exhibit specific behavior, such as described herein.

The computer system 600 may include an address/data bus 602 that is configured to communicate information. Additionally, one or more data processing units, such as a processor 604, are coupled with the address/data bus 602. The processor 604 is configured to process information and instructions. In one aspect, the processor 604 is a microprocessor. Alternatively, the processor 604 may be a different type of processor such as a parallel processor, or a field programmable gate array.

The computer system 600 is configured to utilize one or more data storage units. The computer system 600 may include a volatile memory unit 606 (e.g., random access memory ("RAM"), static RAM, dynamic RAM, etc.) coupled with the address/data bus 602, wherein a volatile memory unit 606 is configured to store information and instructions for the processor 604. The computer system 600 further may include a non-volatile memory unit 608 (e.g., read-only memory ("ROM"), programmable ROM ("PROM"), erasable programmable ROM ("EPROM"), electrically erasable programmable ROM "EEPROM"), flash memory, etc.) coupled with the address/data bus 602, wherein the non-volatile memory unit 608 is configured to store static information and instructions for the processor 604. Alternatively, the computer system 600 may execute instructions retrieved from an online data storage unit such as in "Cloud" computing. In an embodiment, the computer system 600 also may include one or more interfaces, such as an interface 610, coupled with the address/data bus 602. The one or more interfaces are configured to enable the computer system 600 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 600 may include an input device 612 coupled with the address/data bus 602, wherein the input device 612 is configured to communicate information and command selections to the processor 600. In accordance with one aspect, the input device 612 is an alphanumeric input device, such as a keyboard, that may include alphanumeric and/or function keys. Alternatively, the input device 612 may be an input device(s) other than an alphanumeric input device, such as the user interface, panoramic staring sensor and radar, or any combination of devices that provide the functionalities as described herein. In one aspect, the computer system 600 may include a cursor control device 614 coupled with the address/data bus 602, wherein the cursor control device 614 is configured to communicate user input information and/or command selections to the processor 600. In one aspect, the cursor control device 614 is implemented using a device such as a mouse, a track-ball, a track-pad, an optical tracking device, or a touch screen. The foregoing notwithstanding, in one aspect, the cursor control device 614 is directed and/or activated via input from the input device 612, such as in response to the use of special keys and key sequence commands associated with the input device 612. In an alternative aspect, the cursor control device 614 is configured to be directed or guided by voice commands.

In one aspect, the computer system 600 further may include one or more optional computer usable data storage devices, such as a storage device 616, coupled with the address/data bus 602. The storage device 616 is configured to store information and/or computer executable instructions. In one aspect, the storage device 616 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 618 is coupled with the address/data bus 602, wherein the display device 618 is configured to display video and/or graphics. In one aspect, the display device 618 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 600 presented herein is an example computing environment in accordance with one aspect. However, the non-limiting example of the computer system 600 is not strictly limited to being a computer system. For example, one aspect provides that the computer system 600 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 7:
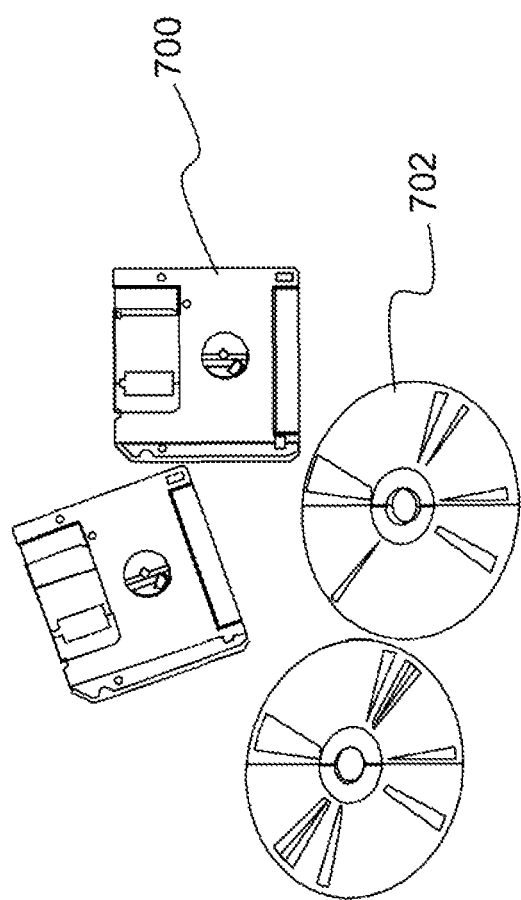
FIG. 7 is an illustration of a computer program product according to the principles of the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible non-transitory computer readable medium.

What is claimed is:

1. A system for surveillance, the system comprising:
one or more processors and a non-transitory computer-readable medium having executable instructions encoded thereon such that when executed, the one or more processors perform operations of:
storing a set of image frames of a field-of-view of a scene captured using a multi-camera panoramic staring sensor in a frame storage database, wherein each image frame is marked with a time of image frame capture;
generating a radar detection when a radar sensor detects an object of interest in the field-of-view of the scene;
based on the radar detection, generating a radar message, marked with a time of radar detection, indicating the presence of the object of interest;
for each radar detection, converting a set of radar coordinates corresponding to the radar detection into a set of multi-camera panoramic sensor coordinates;
creating a video clip comprising a sequence of image frames in the set of image frames, wherein the times of image frame capture for the sequence of image frames correspond to the times of radar detections; and
displaying the video clip, wherein the video clip displays the object of interest.

2. The system as set forth in claim 1, wherein the one or more processors further perform operations of:
comparing, with an active cognitive processor module, each image frame in the set of image frames to a background model;
detecting, with the active cognitive processor module, at least one cognitive detection in an image frame, wherein the at least one cognitive detection corresponds to a region of the scene that deviates from the background model and represents the object of interest;
assigning, with the active cognitive processor module, a cognitive score and a bounding box to each cognitive detection to aid in user analysis, wherein a higher cognitive score corresponds to a greater deviation from the background model, and the bounding box surrounds the object of interest; and
storing the cognitive detections having the highest cognitive scores in the frame storage database.

3. The system as set forth in claim 2, wherein the one or more processors further perform operations of managing cognitive detections according to the following:
requesting a list of cognitive detections having the highest cognitive scores from the active cognitive processor module;
for each cognitive detection in the list, requesting a sequence of image frames comprising the image frame corresponding to the cognitive detection and a plurality of image frames before and after the image frame corresponding to the cognitive detection from the capture and recording module;
for each cognitive detection in the list, constructing a video sequence corresponding to the time of the cognitive detection from the sequence of image frames; and
for each cognitive detection in the list, sending the video sequence to the user interface for user analysis.

4. The system as set forth in claim 3, wherein the one or more processors further perform an operation of retrieving from the active cognitive processor module a cognitive score for a region of a field-of-view of a scene in which a radar detection originated.

5. The system as set forth in claim 4, wherein the one or more processors further perform an operation of detecting, in parallel, objects of interest with both the active cognitive processor module and the radar sensor independently.

6. The system as set forth in claim 2, wherein the one or more processors further performs operations of:
using the bounding box to perform a classification of the cognitive detection in a classification module using object recognition;
applying a tracker to the bounding box, and tracking the bounding box across image frames using a tracking module,
wherein a user can utilize the tracker to switch between at least one image frame in the video clip corresponding to a radar detection to a current location of the object of interest.

7. The system as set forth in claim 1, wherein the one or more processors further perform an operation of forwarding the video clip to a reactive cognitive processor module, wherein the reactive cognitive processor module performs operations of:
comparing the image frames in the video clip to a background model;
detecting at least one cognitive detection in at least one image frame in the video clip, wherein the cognitive detection corresponds to a region of the scene that deviates from the background model and represents the object of interest; and
assigning a cognitive score and a bounding box to each cognitive detection to aid in user analysis, wherein a higher cognitive score corresponds to a greater deviation from the background model, and the bounding box surrounds the object of interest.

8. The system as set forth in claim 1, wherein the one or more processors further perform operations of:
using a plurality of multi-camera panoramic staring sensors to continuously capture the set of image frames of the field-of-view of the scene; and
using a plurality of radar sensors to detect the object of interest to enable the system to scale up the field-of-view to any predetermined value up to a 360-degree field-of-view.

9. A computer-implemented method for surveillance, comprising an act of:
causing one or more processors to execute instructions stored on a non-transitory memory such that upon execution, the one or more processors performs operations of:
storing a set of image frames of a field-of-view of a scene captured using a multi-camera panoramic staring sensor in a frame storage database, wherein each image frame is marked with a time of image frame capture;
generating a radar detection when a radar sensor detects an object of interest in the field-of-view of the scene;
based on the radar detection, generating a radar message, marked with a time of radar detection, indicating the presence of the object of interest;
for each radar detection, converting a set of radar coordinates corresponding to the radar detection into a set of multi-camera panoramic sensor coordinates;
creating a video clip comprising a sequence of image frames in the set of image frames, wherein the times of image frame capture for the sequence of image frames correspond to the times of radar detections; and
displaying the video clip, wherein the video clip displays the object of interest.

10. The method as set forth in claim 9, wherein the one or more processors further performs operations of:
comparing, with an active cognitive processor module, each image frame in the set of image frames to a background model;
detecting, with the active cognitive processor module, at least one cognitive detection in an image frame, wherein the at least one cognitive detection corresponds to a region of the scene that deviates from the background model and represents the object of interest;
assigning, with the active cognitive processor module, a cognitive score and a bounding box to each cognitive detection to aid in user analysis, wherein a higher cognitive score corresponds to a greater deviation from the background model, and the bounding box surrounds the object of interest; and
storing the cognitive detections having the highest cognitive scores in the frame storage database.

11. The method as set forth in claim 10, wherein the one or more processors further perform an operation of managing cognitive detections according to the following:
requesting a list of cognitive detections having the highest cognitive scores from the active cognitive processor module;
for each cognitive detection in the list, requesting a sequence of image frames comprising the image frame corresponding to the cognitive detection and a plurality of image frames before and after the image frame corresponding to the cognitive detection from the capture and recording module;
for each cognitive detection in the list, constructing a video sequence corresponding to the time of the cognitive detection from the sequence of image frames; and
for each cognitive detection in the list, sending the video sequence to the user interface for user analysis.

12. The method as set forth in claim 11, wherein the data processor further performs an operation of retrieving from the active cognitive processor module a cognitive score for a region of a field-of-view of a scene in which a radar detection originated.

13. The method as set forth in claim 12, wherein the data processor further performs an operation of detecting, in parallel, objects of interest with both the active cognitive processor module and the radar sensor independently.

14. The method as set forth in claim 10, wherein the data processor further performs operations of:
using the bounding box to perform a classification of the cognitive detection in a classification module using object recognition;
applying a tracker to the bounding box, and tracking the bounding box across image frames using a tracking module,
wherein a user can utilize the tracker to switch between at least one image frame in the video clip corresponding to a radar detection to a current location of the object of interest.

15. The method as set forth in claim 9, wherein the one or more processors further perform an operation of forwarding the video clip to a reactive cognitive processor module, wherein the reactive cognitive processor module performs operations of:
comparing the image frames in the video clip to a background model;
detecting at least one cognitive detection in at least one image frame in the video clip, wherein the cognitive detection corresponds to a region of the scene that deviates from the background model and represents the object of interest; and assigning a cognitive score and a bounding box to each cognitive detection to aid in user analysis, wherein a higher cognitive score corresponds to a greater deviation from the background model, and the bounding box surrounds the object of interest.

16. The method as set forth in claim 9, wherein the one or more processors further performs operations of:

using a plurality of multi-camera panoramic staring sensors to continuously capture the set of image frames of the field-of-view of the scene; and using a plurality of radar sensors to detect the object of interest to enable the system to scale up the field-of-view to any predetermined value up to a 360-degree field-of-view.

17. A computer program product for surveillance, the computer program product comprising computer-readable instructions stored on a non-transitory computer-readable medium that are executable by a computer having a processor for causing the processor to perform operations of:

storing a set of image frames of a field-of-view of a scene captured using a multi-camera panoramic staring sensor in a frame storage database, wherein each image frame is marked with a time of image frame capture;

generating a radar detection when a radar sensor detects an object of interest in the field-of-view of the scene;

based on the radar detection, generating a radar message, marked with a time of radar detection, indicating the presence of the object of interest;

for each radar detection, converting a set of radar coordinates corresponding to the radar detection into a set of multi-camera panoramic sensor coordinates;

creating a video clip comprising a sequence of image frames in the set of image frames, wherein the times of image frame capture for the sequence of image frames correspond to the times of radar detections; and displaying the video clip, wherein the video clip displays the object of interest.

18. The computer program product as set forth in claim 17, further comprising instructions for causing the processor to perform operations of:

comparing, with an active cognitive processor module, each image frame in the set of image frames to a background model;

detecting, with the active cognitive processor module, at least one cognitive detection in an image frame, wherein the at least one cognitive detection corresponds to a region of the scene that deviates from the background model and represents the object of interest;

assigning, with the active cognitive processor module, a cognitive score and a bounding box to each cognitive detection to aid in user analysis, wherein a higher cognitive score corresponds to a greater deviation from the background model, and the bounding box surrounds the object of interest; and storing the cognitive detections having the highest cognitive scores in the frame storage database.

19. The computer program product as set forth in claim 18, wherein the one or more processors further perform an operation of managing cognitive detections according to the following:

requesting a list of cognitive detections having the highest cognitive scores from the active cognitive processor module;

for each cognitive detection in the list, requesting a sequence of image frames comprising the image frame corresponding to the cognitive detection and a plurality of image frames before and after the image frame corresponding to the cognitive detection from the capture and recording module;

for each cognitive detection in the list, constructing a video sequence corresponding to the time of the cognitive detection from the sequence of image frames; and for each cognitive detection in the list, sending the video sequence to the user interface for user analysis.

20. The computer program product as set forth in claim 19, further comprising instructions for causing the processor to perform an operation of retrieving from the active cognitive processor module a cognitive score for a region of a field-of-view of a scene in which a radar detection originated.

21. The computer program product as set forth in claim 20, further comprising instructions for causing the processor to perform an operation of detecting, in parallel, objects of interest with both the active cognitive processor module and the radar sensor independently.

22. The computer program product as set forth in claim 18, further comprising instructions for causing the processor to perform operations of:

using the bounding box to perform a classification of the cognitive detection in a classification module using object recognition;

applying a tracker to the bounding box, and tracking the bounding box across image frames using a tracking module, wherein a user can utilize the tracker to switch between at least one image frame in the video clip corresponding to a radar detection to a current location of the object of interest.

23. The computer program product as set forth in claim 17, wherein the one or more processors further perform an operation of forwarding the video clip to a reactive cognitive processor module, wherein the reactive cognitive processor module performs operations of:

comparing the image frames in the video clip to a background model;

detecting at least one cognitive detection in at least one image frame in the video clip, wherein the cognitive detection corresponds to a region of the scene that deviates from the background model and represents the object of interest; and assigning a cognitive score and a bounding box to each cognitive detection to aid in user analysis, wherein a higher cognitive score corresponds to a greater deviation from the background model, and the bounding box surrounds the object of interest.

24. The computer program product as set forth in claim 17, further comprising instructions for causing the processor to perform operations of:

using a plurality of multi-camera panoramic staring sensors to continuously capture the set of image frames of the field-of-view of the scene; and using a plurality of radar sensors to detect the object of interest to enable the system to scale up the field-of-view to any predetermined value up to a 360-degree field-of-view.

25. A system for surveillance, the system comprising:
a multi-camera panoramic staring sensor;
a radar sensor;

one or more processors and a non-transitory computer-readable medium having executable instructions encoded thereon such that when executed, the one or more processors perform operations of:
- storing a set of image frames of a field-of-view of a scene captured using the multi-camera panoramic staring sensor in a frame storage database, wherein each image frame is marked with a time of image frame capture;
- generating a radar detection when the radar sensor detects a object of interest in the field-of-view of the scene;
- based on the radar detection, generating a radar message, marked with a time of radar detection, indicating the presence of the object of interest;
- for each radar detection, converting a set of radar coordinates corresponding to the radar detection into a set of multi-camera panoramic sensor coordinates;
- creating a video clip comprising a sequence of image frames in the set of image frames, wherein the times of image frame capture for the sequence of image frames correspond to the times of radar detections; and
- displaying the video clip, wherein the video clip displays the object of interest.

* * * * *